May 25, 1943.  C. T. TROY  2,319,833
LEATHER GRADING MACHINE
Filed April 12, 1940  9 Sheets-Sheet 3

INVENTOR
Constantine T. Troy
BY
ATTORNEYS

May 25, 1943.　　　　　C. T. TROY　　　　　2,319,833
LEATHER GRADING MACHINE
Filed April 12, 1940　　　9 Sheets-Sheet 4
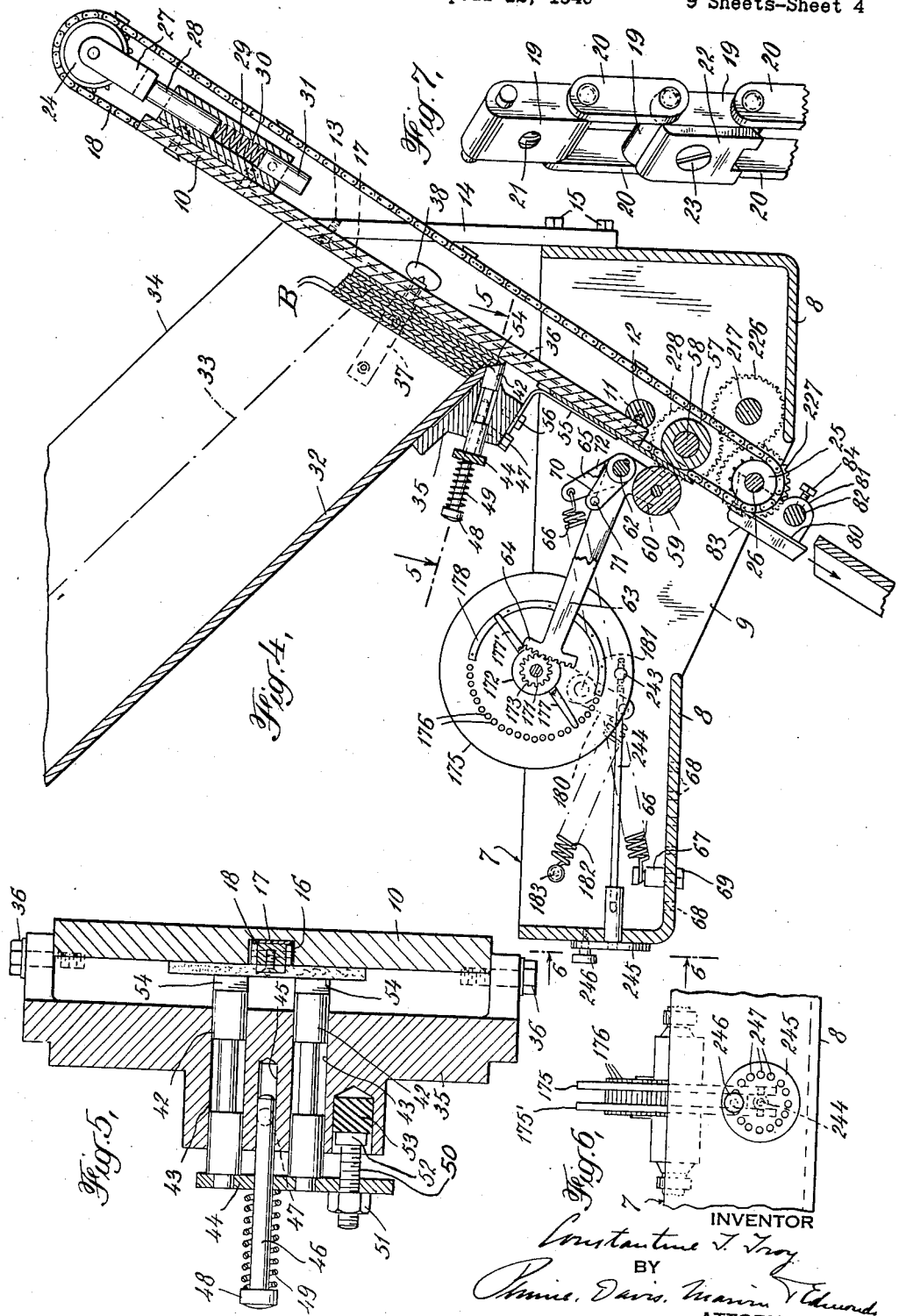
INVENTOR
Constantine T. Troy
BY
Pennie, Davis, Marvin & Edmonds
ATTORNEYS

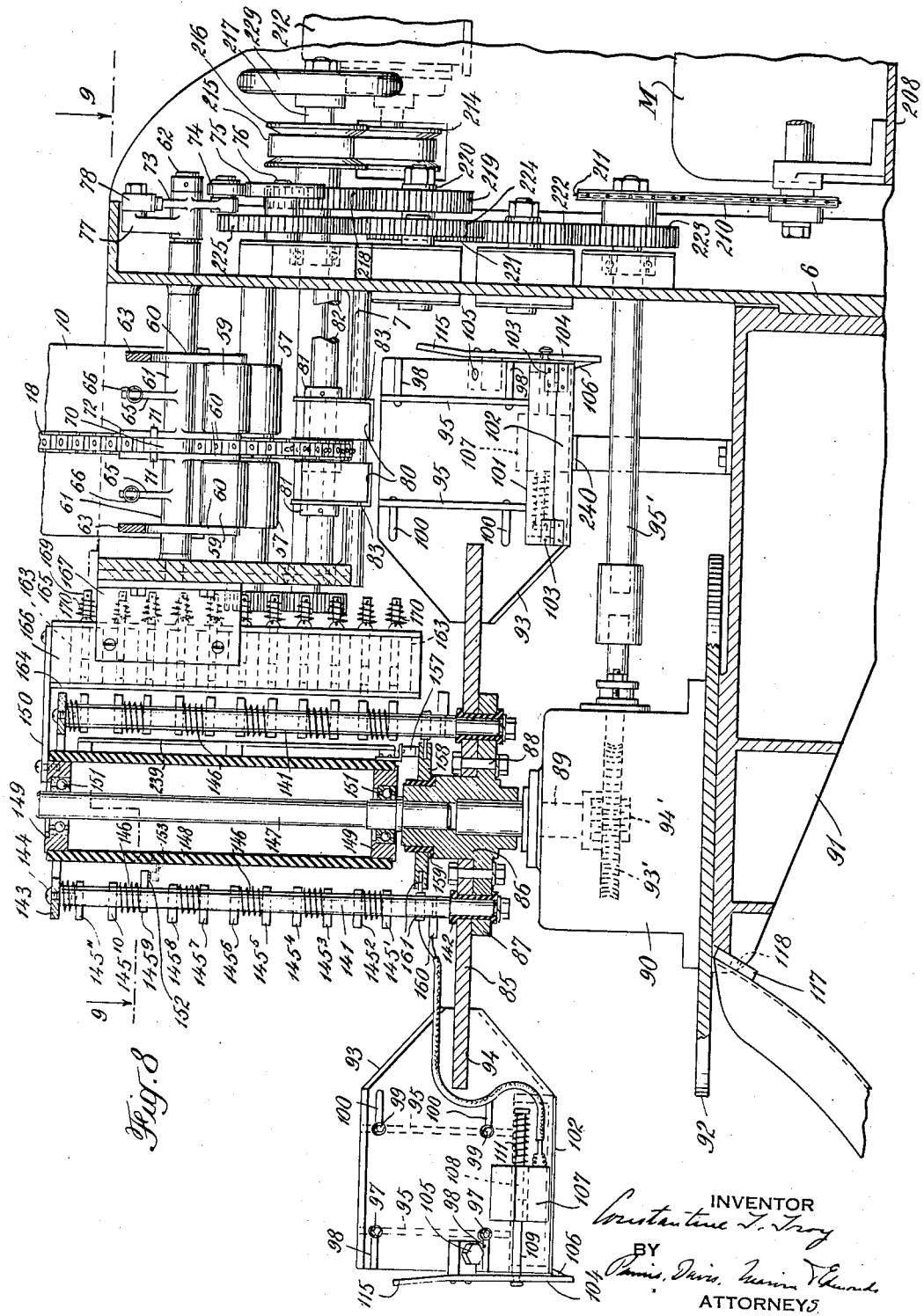

May 25, 1943.  C. T. TROY  2,319,833
LEATHER GRADING MACHINE
Filed April 12, 1940  9 Sheets-Sheet 6
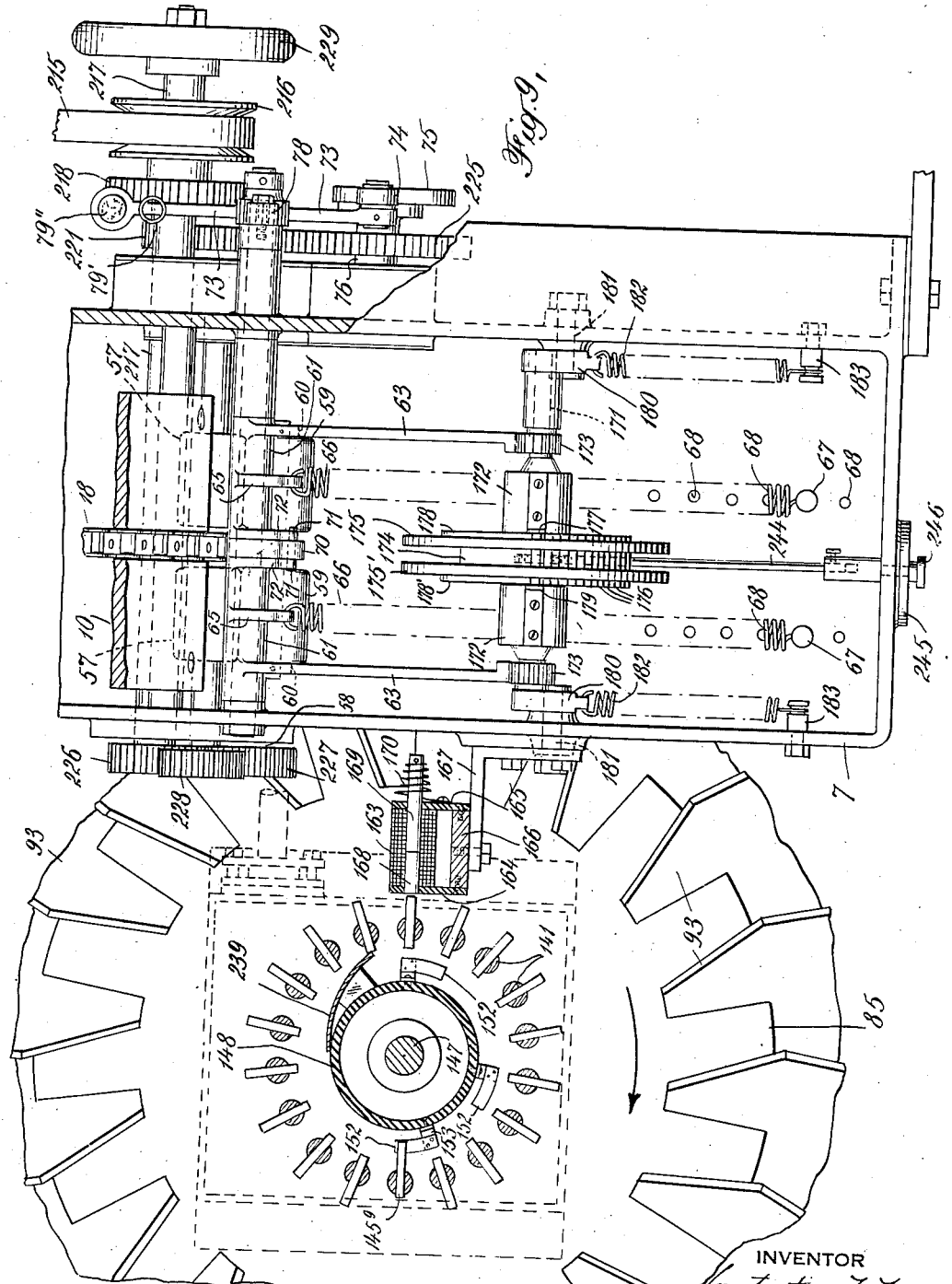
INVENTOR
Constantine T. Troy
BY
ATTORNEYS May 25, 1943.  C. T. TROY  2,319,833
LEATHER GRADING MACHINE
Filed April 12, 1940   9 Sheets-Sheet 7
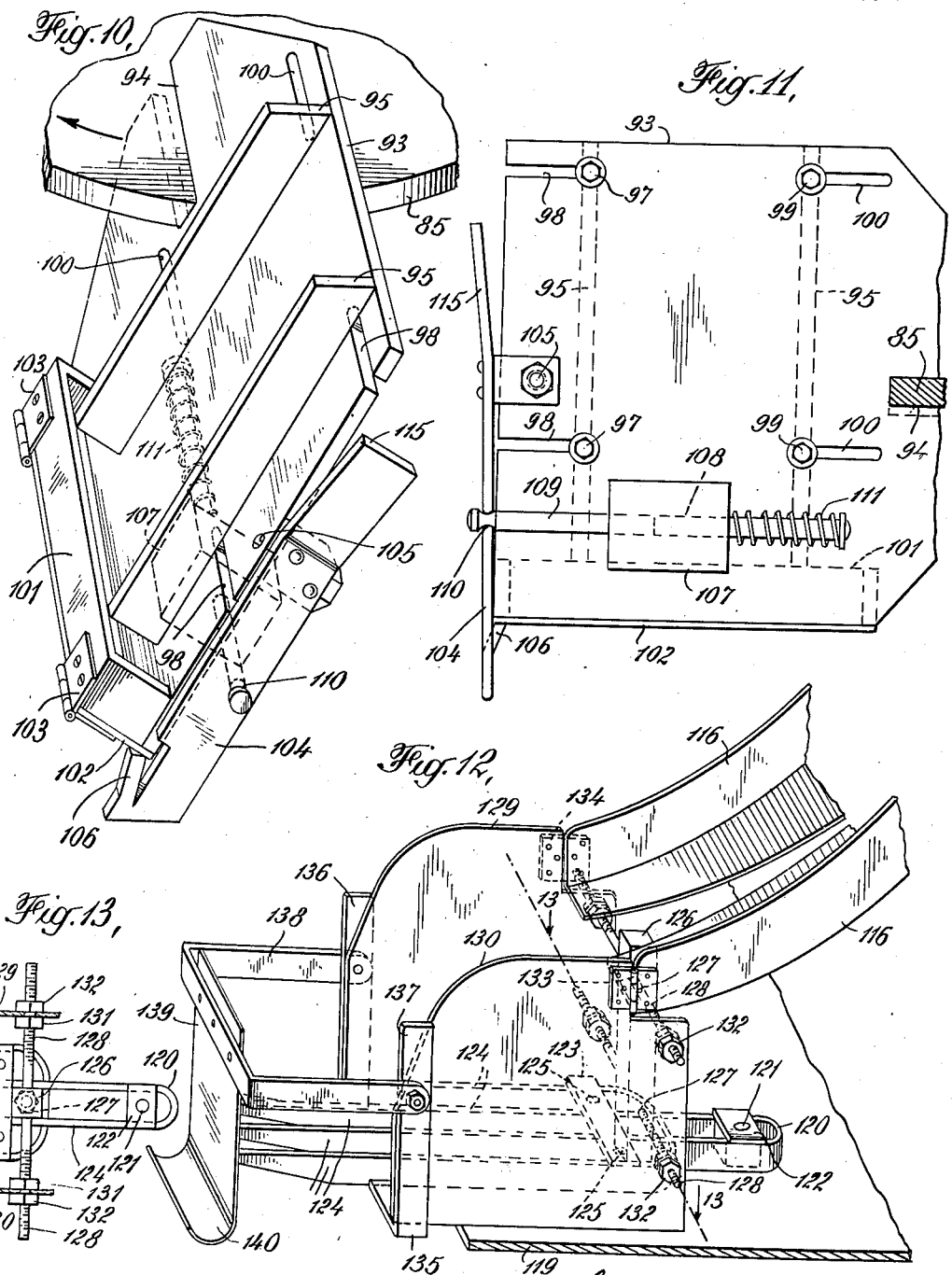

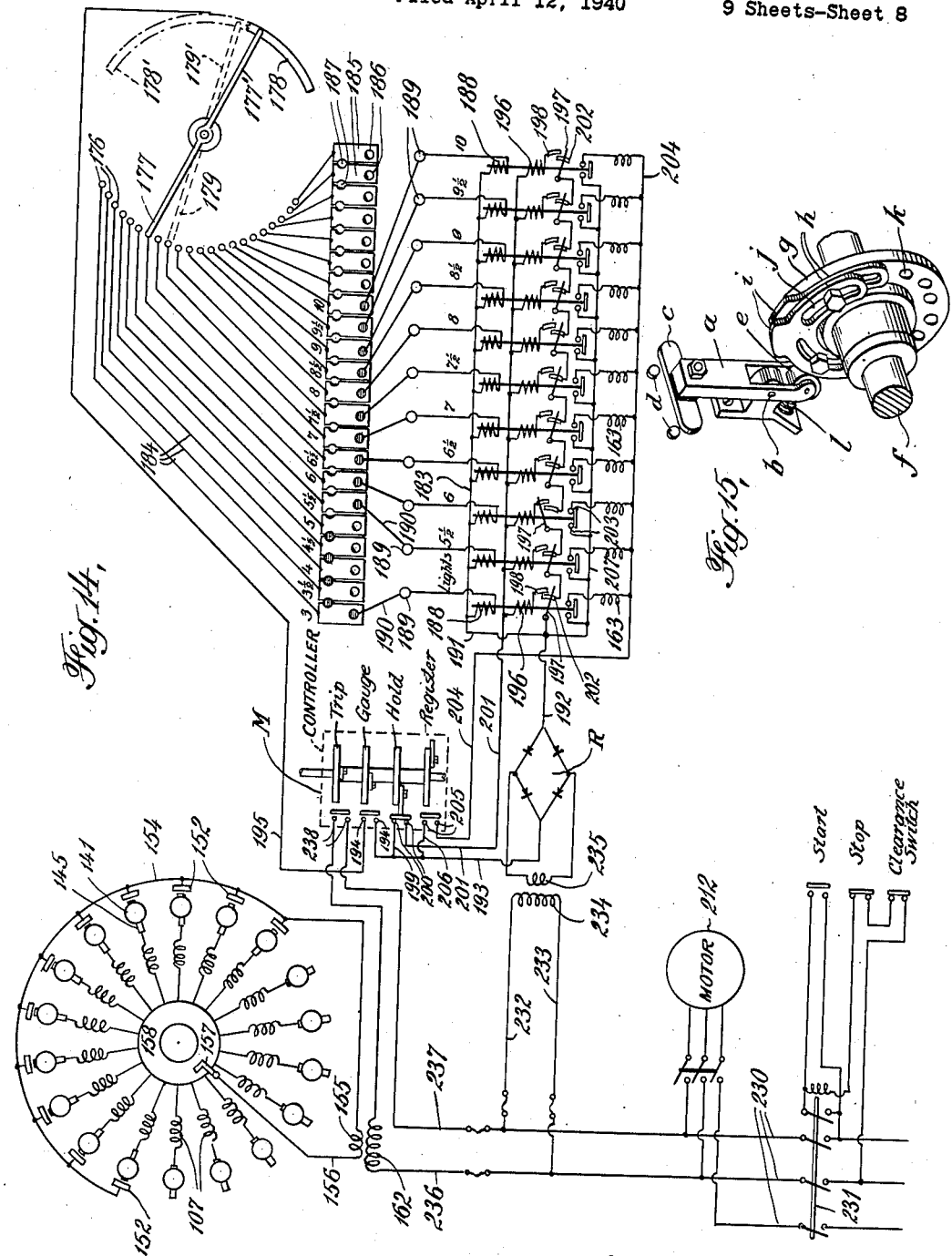

May 25, 1943.  C. T. TROY  2,319,833
LEATHER GRADING MACHINE
Filed April 12, 1940  9 Sheets-Sheet 9
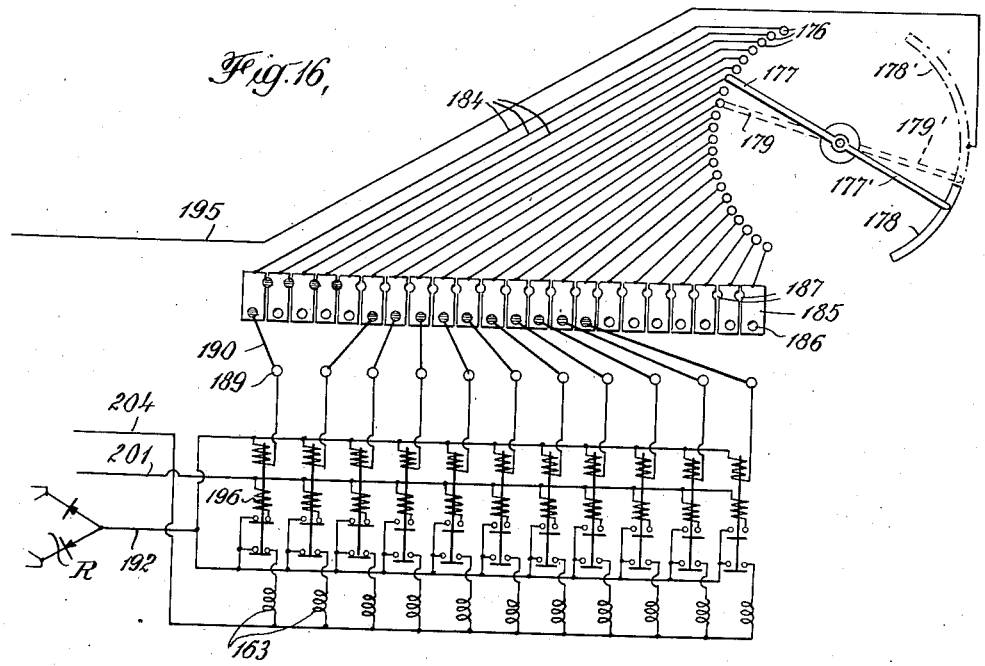
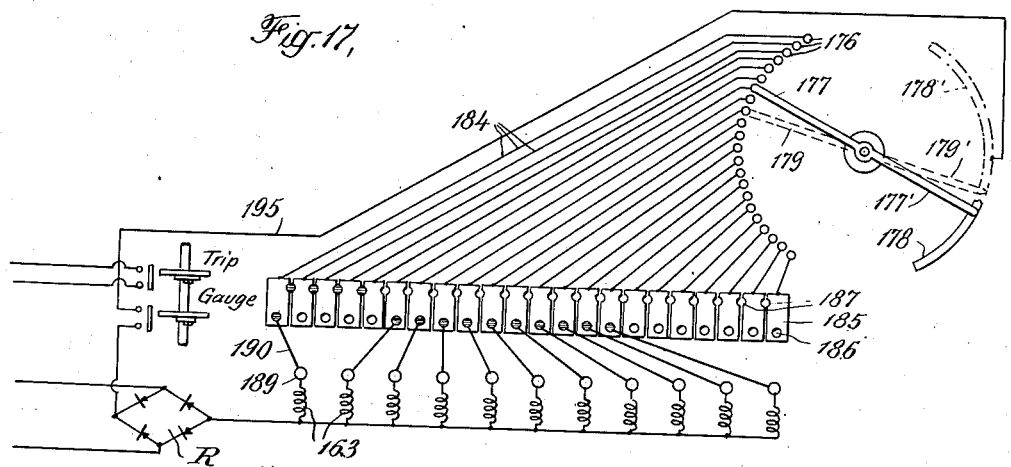
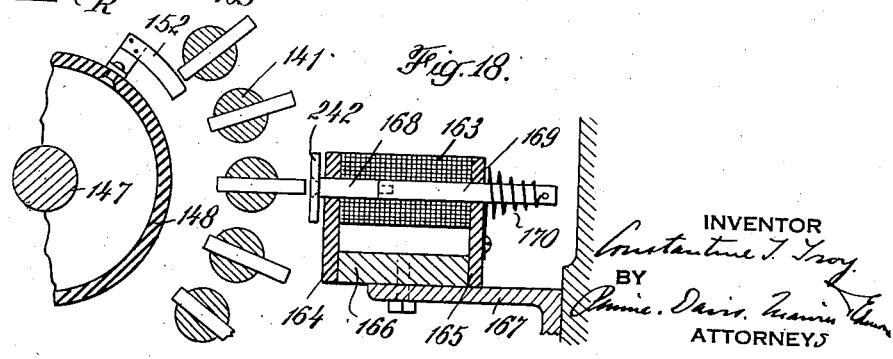
INVENTOR
Constantine T. Troy
BY
ATTORNEYS Patented May 25, 1943

2,319,833

UNITED STATES PATENT OFFICE 2,319,833

LEATHER GRADING MACHINE

Constantine T. Troy, Towanda, Pa.

Application April 12, 1940, Serial No. 329,220

47 Claims. (Cl. 209—88)

This invention relates to machines for gauging leather blanks, such as taps, soles, counters and heels, and automatically sorting them in accordance with the measurement of the thinnest spot on each of them as determined by the gauging mechanism.

My machine comprises in general a hopper for holding a stack of blanks to be gauged and sorted; feeding means for removing the blanks successively from the hopper and moving them past the place at which the gauging takes place; gauging mechanism at such place for gauging the blanks along both lateral edge portions; a carrier having a number of receptacles brought successively into a position such that each blank after gauging will be deposited in one of the receptacles; a number of chutes over the upper ends of which the receptacles move and into one of which a blank passes when it is discharged from its receptacle; a bin at the foot of each chute for collecting the blanks that slide down the chute; and station-selecting mechanism controlled by the gauging mechanism and the setting of which determines the particular place in the movement of the carrier at which each blank is discharged from its receptacle into a chute, whereby the blanks are distributed among the chutes and sorted in accordance with the measurement of the thinnest spot occurring along either lateral edge as determined by the gauging mechanism.

A machine having this general assembly of parts and operating to sort leather blanks in the manner above stated has already been proposed and therefore is not new. However, the machines heretofore proposed, and the few types that have actually been built, are not capable of sorting the blanks with sufficient speed and certainty and have various other faults which are corrected in my machine. Their incapability of sorting the blanks rapidly is due among other things to one or more of the following: the gauging mechanism is unable to operate fast enough, or if capable of operating fast, the station-selecting mechanism is incapable of operating correspondingly fast; the blanks are not kept in continuous motion during their travel through the machine but at one or more points are moved intermittently; and one or more of the principal parts of the assembly operate on the reciprocating or intermittent motion principle instead of continuously as in the case of rotary parts or parts moving in an endless or continuous circuit.

In the preferred form of my machine the blanks are fed in rapid succession, by an endless continuously moving chain, to a set of gauging rolls, there being two rotary but otherwise immovable lower rolls having a common axis, and a pair of cooperating rotary and bodily movable upper rolls. The gauging rolls progressively gauge each blank along each of its lateral edges while the blank is rapidly moving between the upper and lower rolls, the gauging rolls and parts connected with them being capable of performing the gauging satisfactorily even when the blanks are fed to them with great rapidity. To take full advantage of the rapidity with which this kind of gauging can be accomplished I provide electrical means, rather than mechanical, controlled by the movement of the upper gauging rolls for setting the station-selecting mechanism. So far as I am aware no previous leather gauging and sorting machine, built or proposed, for sorting leather blanks in accordance with the measurement of the thinnest spot on each of them has embodied this combination of rapid progressive gauging and electrical setting of the station-selecting mechanism.

Each blank after being gauged is deposited in one of the receptacles on the carrier without any cessation in the movement of the blank. The carrier is a rotary one having a continuous motion to carry out the plan of employing for the principal moving parts of the assembly parts which do not operate on the reciprocating or intermittent motion principle, a further reason for rotating the carrier continuously being to carry out the plan of causing the blanks to travel through the machine with a continuous motion.

Each blank is discharged from its receptacle while the receptacle is in motion and at such a time that the blank will drop into the particular chute for which the blank is destined, and the blank then continues its travel by sliding down the chute until it comes to rest in the bin at the foot of that chute where it becomes one of a pile of blanks having a predetermined range of thickness measured at the thinnest portion on each of them. The discharge of the blanks from the receptacles on the carrier is preferably brought about by electrically tripping the bottoms of the receptacles to permit the blanks to fall from them by gravity. The particular point during the rotation of the carrier at which any receptacle is electrically tripped, and hence the particular chute into which the blank from that receptacle drops, being determined by the setting of the station-selecting mechanism for that blank.

The hopper is located at the top of the machine and the blanks are fed from it edgewise in a downwardly inclined direction, and except for the short time that they are being moved in a horizontal direction by the rotary carrier, they continue this general direction of movement until they reach the bins at the bottoms of the chutes. Among other things this permits transfer of the blanks from one part of the assembly to the next lower part by gravity.

In order that the machine may be universally used for sorting either taps, soles, counters, or heels, the hopper and the receptacles on the carrier as well as the chutes and the bins are all adjustable in width, and the dogs or projections on the feed chain (which latter is operated at a constant speed) and which remove the blanks successively from the hopper are variable as to spacing so that in the case of the shorter blanks, such as taps and heels, there need be no more distance between the blanks on the feed chain than in the case of longer blanks, such as soles. This means, however, that the shorter blanks will be fed in greater number per unit of time than the longer blanks so I make provision for changing the speed of the rotary carrier to make it rotate faster in order to handle the more numerous shorter blanks and slower for the fewer longer blanks. Inasmuch as I provide means for raising and lowering the upper gauging rolls so that they are lowered onto a blank after the blank has already entered the space between the upper and lower gauging rolls and so that they are raised before the blank has passed completely beyond the gauging rolls, the speed at which this raising and lowering mechanism operates is also changed when the speed of the rotary carrier is changed so that its speed too will be accommodated to the length of the blanks being sorted.

Another distinguishing feature of my machine is a switchboard which permits the blanks to be sorted either into piles in each of which the range of thickness measured at the thinnest portion of each is about a whole "iron" or into piles in each of which such range is about half an "iron."

The machine is novel in other respects particularly as to the details of the station-selecting mechanism, the electrical system, and the mechanism for tripping the receptacles on the carrier to discharge the blanks from them, all of which will be described later, but the foregoing is sufficient to show how my machine differs from others in major respects, and is sufficient to give an understanding of the general organization and operation of the machine so that the detailed description now to be given will be easier to follow.

The machine in its preferred form is illustrated in the accompanying drawings, in which:

Fig. 4 is an enlarged vertical section taken on the line 4—4 of Fig. 2;

Fig. 5 is a horizontal section taken on the line 5—5 of Fig. 4;

Fig. 6 is a vertical section taken on the line 6—6 of Fig. 4;

Fig. 7 is a perspective view of part of the feed chain;

Fig. 8 is a duplication of a portion of Fig. 2 drawn to a larger scale to more clearly show the details of construction;

Fig. 9 is an enlarged horizontal section taken on the line 9—9 of Fig. 2;

Fig. 10 is a perspective view of one of the receptacles on the rotary carrier;

Fig. 11 is a rear view of the receptacle;

Fig. 12 is a perspective view of one of the bins and the lower end of the corresponding chute;

Fig. 13 is a horizontal section taken on the line 13—13 of Fig. 12;

Fig. 14 is a schematic diagram of the electrical system;

Fig. 15 is a perspective view of a type of adjustable cam that may be employed in the master controller;

Fig. 16 illustrates a modification of a part of the electrical system;

Fig. 17 illustrates a further modification of the same part of the electrical system; and Fig. 18 is a horizontal section illustrating a change which should be made in a portion of the station-selecting mechanism when the electrical system is modified according to Fig. 17.

In the following description the part of the machine facing to the left in Fig. 2 and facing the bottom of the sheet in Fig. 3 will be referred to as "the front"; the part facing to the right in Fig. 2 and facing the top of the sheet in Fig. 3 will be referred to as "the rear"; and the direction from right to left and vice versa in Fig. 3 will be spoken of as "transversely of the machine."

Figure 1:
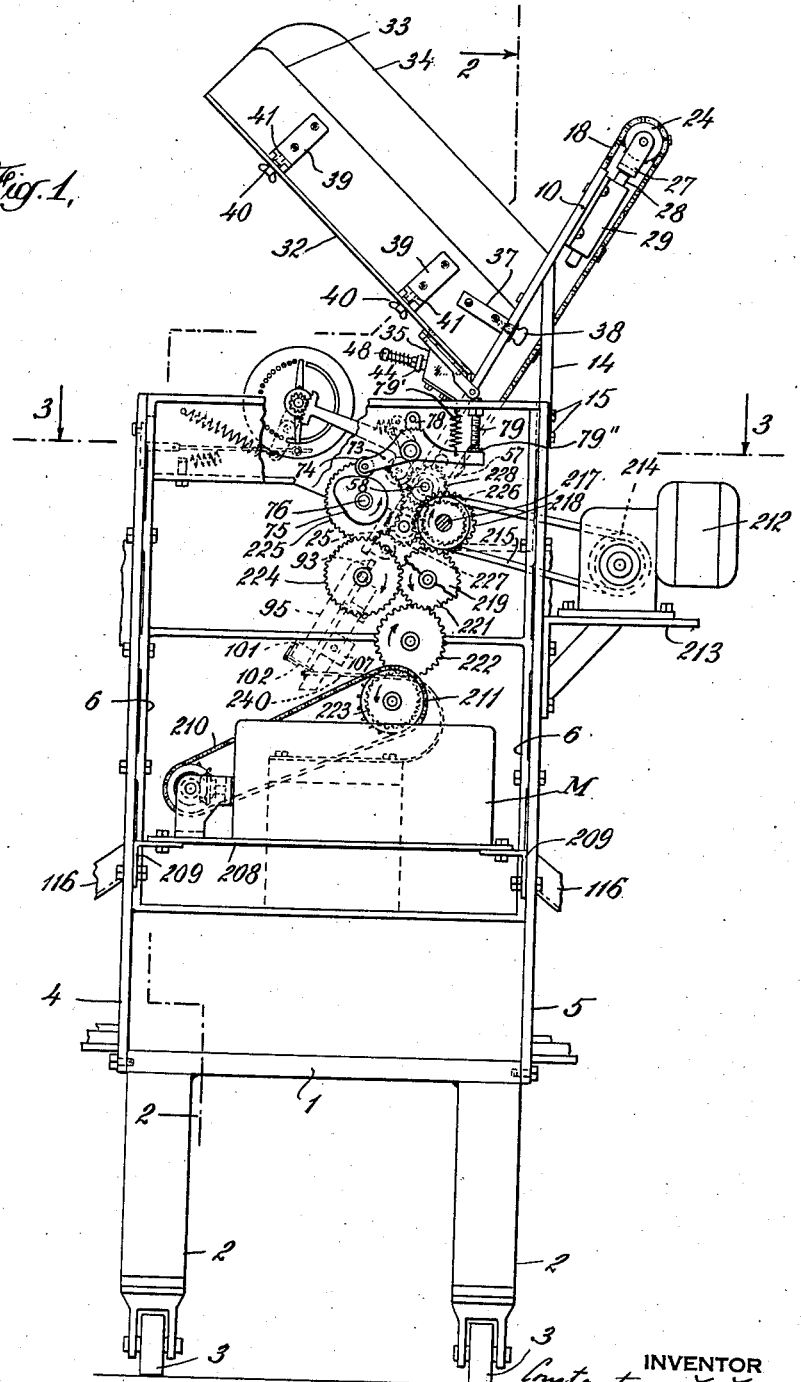
Figure 1 is a rear view of the machine wtih some of the parts broken away and other parts omitted.
Figure 2:
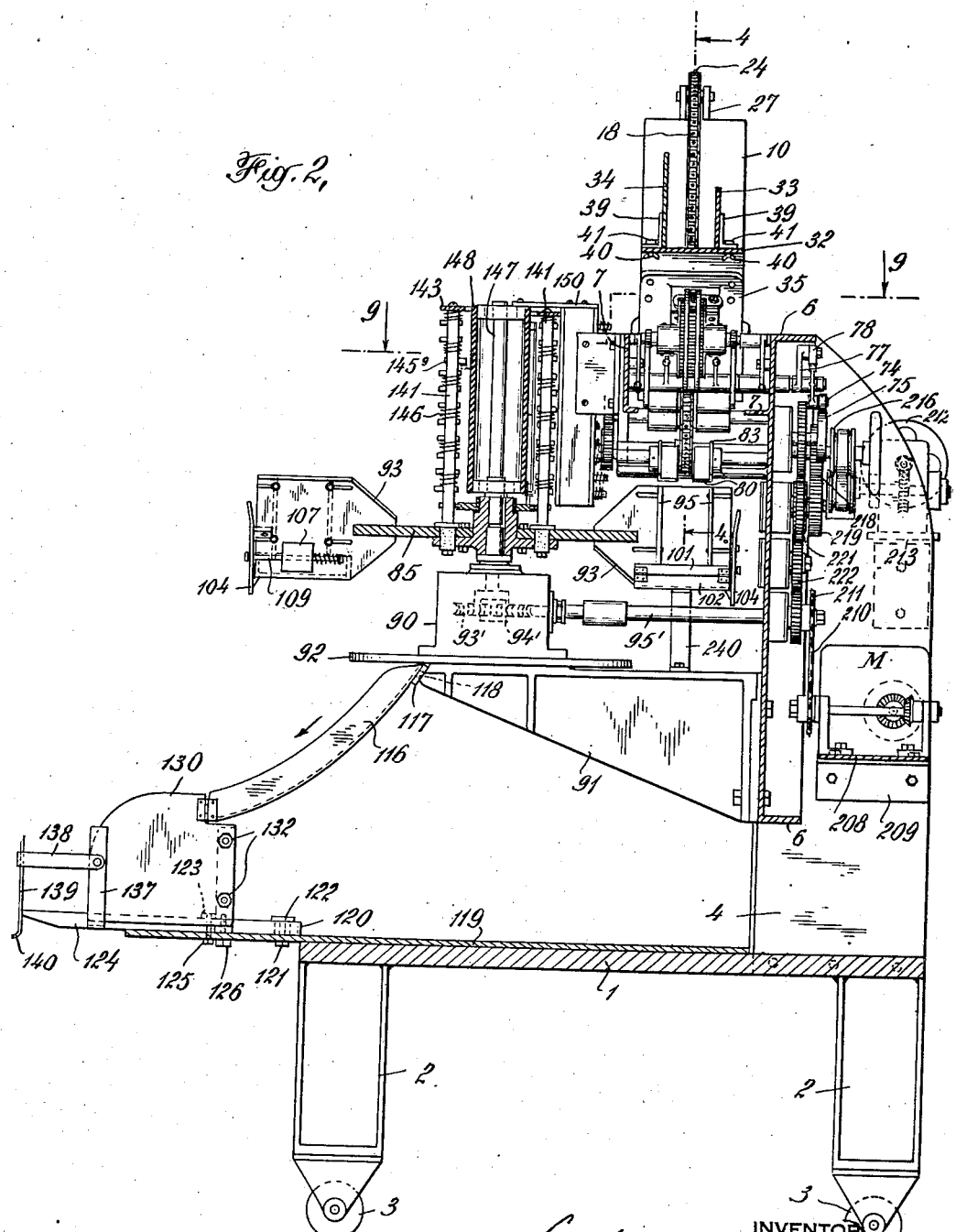
Fig. 2 is a vertical section taken on the line 2—2 of Fig. 1. While this section line lies in front of the rotary carrier, and its associated parts, nevertheless they have been represented in partial section for the sake of clarity.

The machine in its preferred form is supported on a table-like base comprising a plate 1 mounted on four legs 2 (Figs. 1 and 2). The legs may be fastened to the plate in any suitable way as by welding. If desired, the legs may be provided with casters 3.

Figure 3:
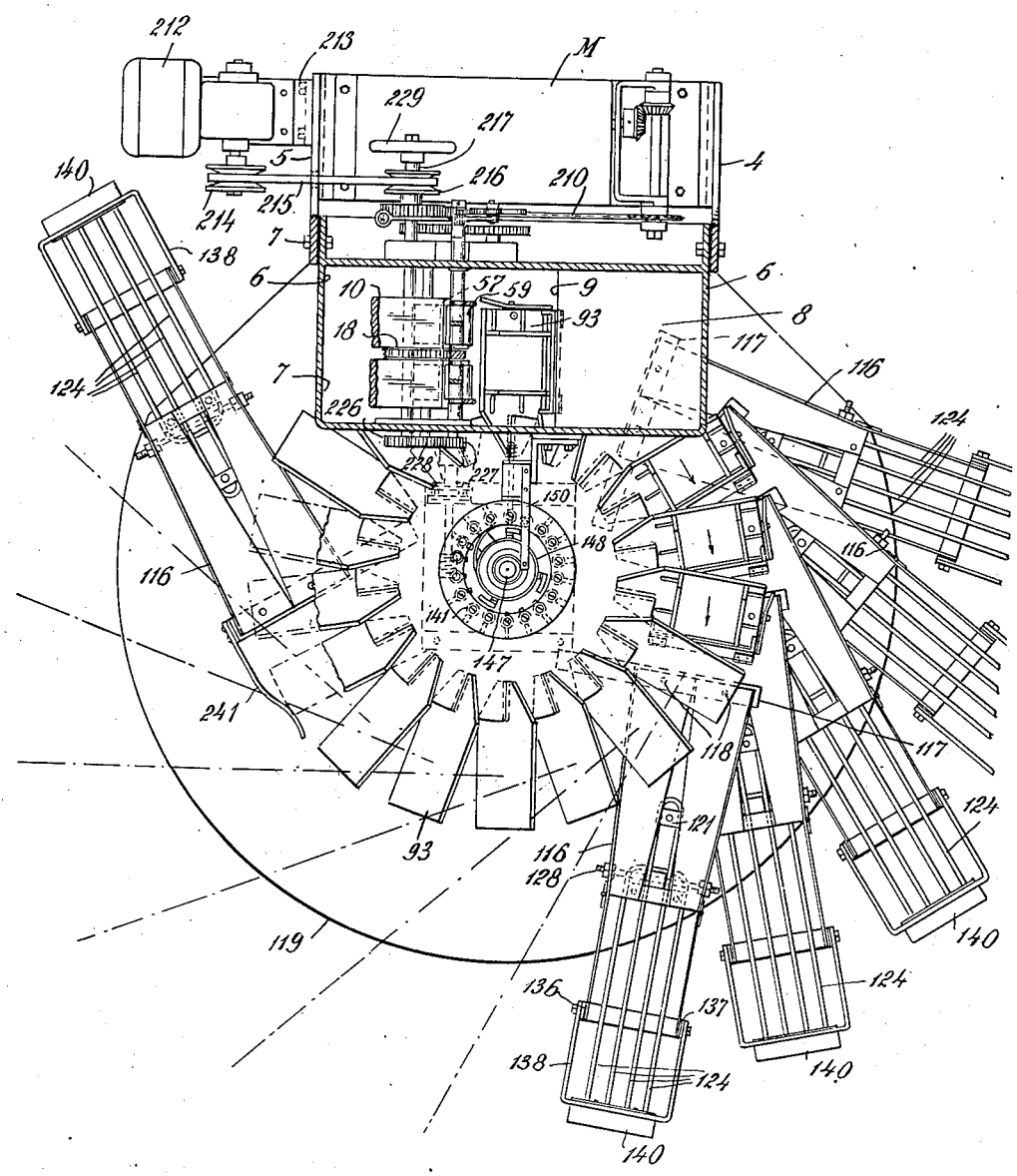
Fig. 3 is a horizontal section taken on the line 3—3 of Fig. 1, only a few of the chutes being shown.

At the rear of the machine two plates 4 and 5 are bolted at their lower ends to the lateral edges of the plate 1 and rise vertically toward the top of the machine (Figs. 1, 2, and 3). These plates are bolted along their forward edges to a casting 6 which is thus supported by the plates. The lower part of the casting is relatively shallow in a direction from front to rear of a machine as will be clear from Fig. 2, but near the top of the casting there is an over-hanging hollow portion 7 which projects towards the front. In the bottom wall 8 of this over-hanging portion there is an opening 9 (Figs. 3 and 4) beneath which the receptacles on the carrier pass and through which the feed chain passes, as hereinafter more fully described.

Located near the top of the machine there is a feed plate 10 which when viewed from the rear of the machine (Figs. 1 and 4) slopes downwardly from right to left and makes an angle of about 60° with the horizontal. This plate is fastened at its lower end by means of screws 11 to a shaft 12 fixed at its ends in the upper part of the casting 6. Near its upper end the plate 10 is fastened, by means of screws 13, to the upper ends of a pair of upright posts 14 (Fig. 4). Each post is fastened to the plate 10 near one of the edges of the plate. The lower ends of the posts 14 are bolted to the upper end of the casting 6 as shown at 15.

The feed plate 10 is provided with a central longitudinal groove 16 in the bottom of which is positioned a liner plate 17 (Fig. 5). The groove 16 accommodates the operative run of a narrow feed chain 18. As shown in Fig. 7 this chain may be made up of blocks 19 pivotally connected by links 20. Each block has a threaded opening 21 so that a number of feed dogs 22 may be fastened to a number of the blocks 19 by means of screws 23. Every block does not have a dog secured to it but only certain blocks depending upon what spacing is desired between the dogs as hereinafter pointed out.

The feed chain passes over an upper idle sprocket 24 and a lower driven sprocket 25 secured to a shaft 26 journalled at its ends in the casting 6 (Fig. 4). The upper sprocket 24 is mounted in a yoke 27 provided with a pin 28 that is adapted to slide in the bore of a casting 29 bolted to the underside of the plate 10. A coil spring 30, reacting at its lower end against an adjustable plug 31 in the bore and at its upper end against the pin 28, serves to yieldingly tension the chain. A great deal of loose flesh and leather dust particles come off the blanks as they go through the machine and much of this adheres to the chain links and sprockets and would cause the chain to bind and become very tight thus throwing a strain on the bearings and the motor if it were not for the spring-cushioned sprocket. When the chain is cleaned it might be too loose if it were not for the spring-cushioned sprocket thus causing the links of the chain to be canted when a feed dog engages a blank with consequent danger of the front edge of the dog rising so far that it would feed two blanks instead of one. By automatically taking up the slack in the chain after it is cleaned the spring-cushioned sprocket prevents this action.

The hopper for holding the blanks to be fed to the machine comprises a bottom plate 32 and side plates 33 and 34 (Figs. 1 and 4). The bottom plate 32 is inclined and slopes in a direction opposite to that in which the feed plate 10 slopes. Its plane intersects the plane of the feed plate 10 in a horizontal line and the plane of one is almost at right angles to the plane of the other. As best shown in Fig. 1 the blanks to be fed to the machine, some of which are represented at B in Fig. 4 are placed in the hopper so that they are supported edgewise on the bottom plate 32 and so that the bottom blank rests flatwise on the surface of the feed plate 10. With the hopper and feed plate arranged as just described the bottom blank is relieved of the full weight of the blanks above it, because their weight is partly borne by the inclined bottom plate 32 of the hopper. The blanks are therefore fed more readily from the hopper than would be the case if the feed chain were substantially horizontal and the blanks were supported in a vertical column above it.

The bottom plate 32 of the hopper is fastened to a casting 35 (Figs. 4 and 5) the lower edge of which is bifurcated to provide a pair of arms which project over the lateral edges of the feed plate 10 and are bolted to it as shown at 36. To support some of the weight of the hopper and to prevent it from swinging downwardly around the axis of the bolts 36 each side plate of the hopper has secured to its outer surface a bar 37 which is substantially square in cross section. The end of each of these bars rests against the upper face of the feed plate 10 and is threaded to receive the shank of the thumb screw 38 which passes through a slot in the feed plate 10, the winged end of the thumb screw being positioned below the feed plate.

The side plates 33 and 34 of the hopper are fastened to the bottom plate 32 in such a way that they are adjustable toward and away from each other to vary the width of the trough-like passage in the hopper to accommodate different kinds of blanks. This is preferably accomplished by mounting each side plate on the bottom plate by means of a pair of brackets 39, one arm of each of which is fastened to the outer surface of the side plate, as shown in Fig. 1, and the other arm of which lies against the upper face of the bottom plate and is slotted to receive the shank of a thumb screw 40 cooperating with a nut 41. By loosening these thumb screws and the nuts and also the thumb screws 38 the side plates 33 and 34 may be moved toward or away from each other and then clamped in their adjusted position by tightening the screws and nuts.

When the feed chain 18 is operated, each dog will engage the upper edge of that blank in the hopper which lies against the feed plate 10, and will push it through a feed opening provided between the lower edge of the bottom plate 32 of the hopper and the upper surface of the feed plate 10. This feed opening must necessarily be wide enough to permit passage of the thickest blanks that the machine may be called upon to gauge and sort. Therefore, in the case of thinner blanks the bottom one that is being fed from the hopper might pull one or more of the others along with it by friction if some means were not provided for allowing only the bottom blank to pass through the feed opening. I therefore provide a pair of retaining fingers, or pins 42 mounted to slide in a pair of bores 43 formed in the casting 35 (Figs. 4 and 5). At their upper or outer ends the retaining pins are rigidly connected to a common cross bar 44. The casting 35 is provided with another bore 45 in which a pin 46 is adjustably held by means of a set screw 47. The pin 46 passes through an opening in the bar 44 and its extremity is provided with a head or shoulder 48 between which and the bar 44 a coil spring 49 is mounted. The coil spring yieldingly urges the two retaining pins toward the feed plate 10. A bolt 50 is threaded through the cross bar 44 and locked in position by a nut 51. The head 52 of this bolt presses on a rubber block 53 positioned in another bore in the casting 35. In this way the inward or downward movement of the retaining fingers is limited and cushioned. By turning the bolt 50 the size of the gap between the ends of the retaining fingers and the surface of the feed plate 10 may be regulated. Preferably the ends of the retaining fingers are slightly beveled as shown at 54 so that the bottom blank in being pushed out of the hopper by the feed chain will force the retaining fingers back and allow only the bottom blank to feed forward while the others above it will be held back by the retaining fingers. When a blank leaves the hopper it passes under a pair of spring fingers 55 fastened to the casting 35 by bolts 56. One of these fingers engages the blank at each side of the slot in the feed plate in which the feed chain moves. The spring fingers 55 press the blank firmly against the upper surface of the feed plate and guide it between the upper and lower gauging rolls.

One of the two lower gauging rolls is shown in cross section at 57 in Fig. 4. The two lower gauging rolls are mounted on a shaft 58 so that they have a common axis and with the adjacent ends of the rolls spaced apart, as best shown in Fig. 8. If desired they may be formed integrally with the shaft. The upper run of the feed chain passes through the gap between the adjacent ends of the two rolls. The shaft on which these two rolls are mounted is rotated through gearing in the manner hereinafter described. Except for the rotary motion imparted to these two gauging rolls they are otherwise immovable, i. e., as the blank passes over them they constitute a firm support for the blank. Cooperating with the lower gauging rolls 57 are two upper gauging rolls 59 also arranged so that they normally have a common axis but each of these upper gauging rolls has its own mounting so that each roll is bodily movable up and down independently of the other. Each of the upper gauging rolls is idly rotatably mounted in a pair of arms 60 radiating from a sleeve 61 which is loosely mounted on a shaft 62 (Fig. 8). This shaft is journalled at its ends in the upper part of casting 6 and extends in a direction from front to rear of the machine. It should be understood that there are two of these sleeves 61, one for each of the upper gauging rolls. Each of the sleeves 61 has an elongated arm 63 which extends transversely of the machine and the end of which is shaped to form a toothed sector 64 (Fig. 4). Each sleeve 61 is provided with another arm 65 to which one end of a coil spring 66 is connected. The other end of the coil spring is fastened to a stud 67 carried by the bottom wall 8 of the overhanging portion of the casting 6. As shown in Figs. 4 and 9 each of the studs 67 has a threaded shank which may be inserted into any one of a series of holes 68 in the casting and then clamped in position by means of a nut 69. In this way the tension of each spring 66 on its corresponding arm 65 can be regulated.

It will now be seen that as a blank passes between the upper and lower gauging rolls one of the upper rolls will engage the blank along one of its lateral edges and the other upper roll will engage the blank along its opposite lateral edge. Variations in the thickness of the blank will cause the two upper gauging rolls to move bodily and independently in response to these variations. The coil springs 66 will retain the upper gauging rolls in contact with the surface of the blank but will yieldingly permit them to be swung upwardly as the thicker portions of the blank pass under them. Each of the upper rolls independently transmits its bodily movement to one of the aforementioned arms 63. The oscillation of the outer toothed ends of these arms controls the electrical system which sets the station-selecting mechanism as hereinafter described.

Instead of relying upon the blank itself to force open the gauging rolls which in the case of thin blanks might cause them to buckle, or might mar the entering end of the blank, mechanism is provided for raising and lowering the upper gauging rolls so that they are lowered to engage the blank at about one half or three quarters of an inch behind the leading edge of the blank and are lifted off of the blank about a half an inch from the rear edge of the blank. This mechanism comprises an arm 70 keyed to the shaft 62 (Figs. 4, 8 and 9) from each side of which a pin 71 projects. When the arm 70 swings upwardly these pins are adapted to simultaneously engage two arms 72 one of which is formed on the sleeve that carries one of the upper gauging rolls, and the other of which is formed on the sleeve that carries the other upper gauging roll. This will swing both of the sleeves on which the upper gauging rolls are mounted upwardly. An arm 73 is loosely mounted intermediate its ends at the outer end of the shaft 62, at the rear of the machine (Figs. 1 and 8). One end of this arm is provided with a roller 74 which engages a cam 75 mounted on a stub shaft 76. Although the arm 73 is loose on the shaft 62 it is normally locked thereto through an arm 77 which is keyed to the shaft 62 (Fig. 8) and through a toothed locking element 78, detachably bolted to the outer end of the arm 77 and whose teeth are adapted to engage with teeth provided on the arm 73. Therefore the cam actuated arm 73 is normally locked to the shaft 62 but its angular position on the shaft can be adjusted by unbolting the locking element 78, shifting the cam actuated arm 73 to the desired position and then rebolting the locking element 78. The other end of the cam actuated arm 73 is yieldingly held against the end of an adjustable stop pin 79 by a coil spring 79'. The pin 79 limits the downward movement of the cam actuated end of this lever, a rubber plug 79'' serving as a cushion. When the cam 75 lifts the arm 73 the motion is transmitted through the locking element 78, through the arm 77 which carries it, then through the shaft 62 to the arm 70 keyed to the shaft and through the pins 71 to the arms 72. The sleeves 61 which carry the upper gauging rolls are thereby shifted to lift these rolls. This occurs when there is yet about a half inch more of the blank to pass through the gauging rolls as above stated. The rotation of the cam 75 is so timed that it permits the arm 73 to move downwardly and thereby lower the upper gauging rolls on the next succeeding blank about a half or three quarters of an inch behind its leading edge as stated above. When the upper gauging rolls have been lowered far enough to rest upon the surface of the blank, the cam actuated end of the arm 73 continues to move downwardly (until its opposite end engages the stop pin 79) thereby moving the pins 71 away from the arms 72 far enough to permit the upper gauging rolls to then follow all the irregularities of the blank and in so doing move downwardly far enough to gauge even the thinnest portions of the blank without being interferred with by the arms 72 moving into engagement with the pins 71. The stop pin 79 is adjusted to allow the gauging rolls to engage the thinnest blank that is likely to be encountered. By adjusting the angular position of the cam actuated arm 73 on its shaft the amount of lift imparted to the upper gauging rolls may be varied.

The mechanism for lifting the upper gauging rolls off of a blank and lowering them onto a succeeding blank not only eliminates injury to the blank and buckling of a thin blank such as might occur if the blank has to force the gauging rolls open as above stated, but it also eliminates a great deal of shock in the machine and stress in the feed chain and driving mechanism. Buckling of a thin blank after the upper gauging rolls have been lowered onto it, due to the pushing action of a feed dog on it, is eliminated by the positive drive of the lower gauging rolls which pulls the blank through the gauging rolls while it is being pushed by the dog. This also helps a great deal in relieving stress on the feed chain.

Soon after the blank passes the gauging rolls it is discharged by the feed chain and then slides by gravity down a guide which directs the blank directly into one of the receptacles or blank holders on the rotary carrier. This guide comprises two plates 80 each of which is carried by a casting 81 slidably mounted on a cross shaft 82 fixedly mounted in the casting 6 (Figs. 4 and 8). Each casting 81 bears near its upper end on the sprocket shaft 26 for additional support. Along the outer edge of each plate 80 there is an upstanding flange 83. The plates 80 together with their flanges 83 therefore form a trough-like guide through which the blanks slide. Each casting 81 is secured to the shaft 82 by means of a set screw 84 so that by loosening the set screws the castings may be adjusted along the shaft 82 toward or away from each other to vary the width of the passage through the guide to accommodate blanks of different kinds.

As just stated the descending blank is directed by means of the guide into one of the receptacles on the rotary carrier. The carrier comprises a plate 85 (Figs. 2, 3, 8 and 9) which has a central opening to receive a hub 86. This hub has a flange 87 to which the carrier plate 85 is bolted as shown at 88. The hub 86 is fastened to and rotated by a vertical shaft 89 which extends downwardly into a gear reduction box 90. This box, the rotary carrier, and the parts above it are all supported on a bracket 91 bolted to the lower part of the casting 6 and extending forwardly therefrom as best shown in Fig. 2. Interposed between the gear reduction box 90 and the bracket 91 is a circular plate 92 the purpose of which will be referred to later.

The lower end of the vertical shaft 89 is provided with a worm wheel 93' meshing with a worm 94', the latter being mounted on a shaft 95' journaled at its rear end in the casting 6 and actuated by the gearing to be hereinafter described.

The construction of the receptacles and the manner in which they are mounted on the carrier plate are best shown in Figs. 10 and 11. The back wall of each receptacle comprises an inclined plate 93 which is provided at its inner edge with a horizontal slot 94 so that the plate can be slipped over the edge portion of the carrier plate 85 and welded to it. When a receptacle is under the guide the inclination of its back wall 93 conforms with the inclination of the feed chain and the other parts which cause the blanks to move in a downwardly inclined direction. It will be understood that the upper and lower edges of the slots 94 are suitably beveled so that each receptacle plate 93 may be welded to the edge portion of the carrier plate at the proper inclination.

Supported by each receptacle plate 93 are two side plates 95 which are adjustable toward and away from each other to accommodate blanks of different kinds. For this purpose the edge of each side plate is bolted to the inclined plate 93 by a pair of bolts, the two bolts 97 for one of the side plates passing through slots 98 in the inclined plate 93, and the other pair of bolts 99 passing through slots 100 in this plate. By loosening the bolts the side plates 95 may be adjusted laterally, the slots through which the bolts pass permitting this lateral movement.

The legs of a U-shaped member 101 are welded or otherwise secured to the lower part of the inclined plate 93. The bottom member 102 of the receptacle is hinged to the U-shaped member by means of hinges 103 and serves to normally close the bottom of the receptacle and the passage through the U-shaped member 101. The bottom of the receptacle is normally held closed by a latch 104 pivoted at 105 to the inclined plate 93. As will be clear from Figs. 10 and 11 this latch pivots around an axis which is at right angles to the plate 93. When the latch is in the position shown in these figures a tongue 106 of the latch engages one corner of the bottom 102 and holds it in a closed position. When the latch is swung about the axis of its pivot 105 tongue 106 releases the bottom 102 and permits it to drop by gravity. Mounted on the rear face of each inclined plate 93 is an electric solenoid 107 having a plunger, one section 108 of which is made of magnetic material and the other section 109 of which is made of non-magnetic material. The outer end of section 109 is connected to the latch 104 as shown at 110. A coil spring 111 normally retains the composite plunger 108—109 in the position shown in Fig. 11 with the latch 104 in its operative position. When, however, the solenoid is energized the composite plunger moves to the left as viewed in Fig. 11 thus releasing the latch and allowing the bottom of the receptacle to fall to its open position to discharge the blank from the receptacle. As hereinafter pointed out, this energization of the solenoid to discharge the blank occurs when the receptacle is about to pass over the chute selected by the station-selecting mechanism for that particular blank. The upper end of the latch 104 is flared outwardly as shown at 115 so that when the receptacle passes over the last chute the latch will be mechanically operated by a cam to be hereinafter described, and thus discharge from the receptacle any blank which happens to remain in the receptacle until the last chute is reached. The receptacle does not require any kind of a closure opposite the inclined plate 93 because the lower edge of the blank rests on the bottom 102 and the body of the blank leans rearwardly against the plate 93 and therefore has no tendency to fall forward out of the receptacle. The receptacle is therefore in the nature of an uncovered chute with a hinged bottom.

In the preferred form of the machine there are eighteen receptacles. During the rotation of the carrier the receptacles pass over the upper ends of twelve chutes. Each chute is supported at its upper end by the circular plate 92 above referred to. For the sake of clearness only one of the chutes is shown at 116 in Fig. 2, and only several are shown in the plan view of Fig. 3. It will be noted that they are tangentially arranged with respect to a vertical projection of the pitch circle of the carrier-receptacles onto a horizontal plane intersecting the chutes. By "pitch circle" of the carrier-receptacles is meant the circle which passes through each receptacle about mid-way between its inner and outer ends. As best shown in the Fig. 3 each chute is divided longitudinally, the two sections of each chute being supported at their upper ends by a bar 117 welded to the plate 92 and projecting beyond the outer edge of this plate at an appropriate angle to support the chute in the proper position relative to a receptacle that is in readiness to discharge its blank into the chute. Each section of the chute is pivotally connected with the bar 117 by means of a pin 118 (Figs. 3 and 8).

At the bottom of each chute there is a collecting bin illustrated in perspective in Fig. 12. The bottom of each bin is shaped like a fork that is supported on a large plate 119 which in turn is supported by the base plate 1. The inner end of the fork-like bottom of the bin is in the form of a loop 120 and is clamped to the plate 119 by means of a bolt 121 and a clamping plate 122. Another clamping plate 123 extends across the tines 124 of the fork-like bin-bottom and this plate is clamped to the large plate 119 by means of bolts 125 so that it in conjunction with the clamping plate 122 serves to attach the fork-like bin-bottom firmly to the plate 119 and allow for longitudinal adjustment of it. The tines of the fork-like bottom extend outwardly beyond the edge of the plate 119 as best shown in Fig. 2. An upright post 126, which is substantially square in cross section, is bolted at its lower end to the large plate 119 and rises vertically through the looped portion 120 of the fork-like bin-bottom. The post 126 has a pair of transverse openings 127 each of which supports a rod 128. The bin has two side plates 129 and 130 each of which has a pair of openings near its rear edge. Each of these openings loosely receives a threaded end portion of one of the rods 128. Where each rod passes through each opening the side plate is clamped between an inside nut 131 and an outside nut 132 having threaded engagement with the ends of the rods. Thus it will be seen that the two side plates of the bin are supported by the upright post 126 and by the two rods 128 passing through it and to the ends of which the side plates of the bin are clamped. By turning the inside nuts 131 so that they move toward each other on the rod 128, the side plates 129 and 130 of the bin may be adjusted toward each other and then clamped in position by drawing up on the outside nuts 132. Likewise, by slacking off the outside nuts 132 the side plates of the bin may be moved apart and clamped in their new position by turning the inside nuts 131 so that they will move outwardly on the rods.

The lower end of the chute which leads to the bin is supported by the side plates of the bin. As shown in Figure 12 one section of the chute is hinged at its lower end to the side plate 130 by a hinge 133 and the other section of the chute is hinged at its lower end to the side plate 129 of the bin by a similar hinge 134. It will be understood that the axis of each hinge is arranged vertically so that when the side plates of the bin are adjusted toward or away from each other the two sections of the chute will be simultaneously adjusted, this movement of the chute sections being permitted by the pivotal connection of the upper ends of the chute sections to the bars 117.

A U-shaped strap 135 passes under the tines 124 of the fork-like bottom and is welded to them. The upright portions 136 and 137 of this strap are pivoted to the extremities of another U-shaped member 138 which projects forwardly in a substantially horizontal plane, as shown in Fig. 12. The outer cross piece of the U-shaped member 138 has secured to it a plate 139 which rests against the extremities of the tines of the fork-like bin-bottom. Preferably the lower end of the plate 139 is curved upwardly and outwardly as shown at 140. The plate 139 constitutes a hinged door for retaining the blanks in the bin until it is desired to remove them. The blanks sliding down the chute by gravity pile up uniformly in the bin and when it is desired to remove them the operator lifts the door 139 with the back of his hand then grasps the pile of blanks and withdraws them from the bin, the fork-like construction of the bin-bottom permitting the pile of blanks to be readily grasped between the fingers.

The station-selecting mechanism, i. e., the mechanism which determines the particular chute into which a blank will be discharged by the rotary carrier, and the electrical mechanism controlled by the gauging rolls for setting the station-selecting mechanism will now be described.

The carrier plate 85 is provided with a circular series of eighteen holes which also extend through the flange 87 of the hub 86 (Fig. 8). Into each of these holes is fitted the lower end of an upright metallic post 141. Thus there are eighteen of these posts arranged in a circular series, one post being located radially inward from each receptacle on the carrier (see also Fig. 9). The lower end of each post 14 is electrically insulated from the carrier plate 85 and the flange 87 of the hub 86 by means of an insulating sleeve 142. The upper ends of the posts 141 are braced by means of a ring 143 of insulating material to which each post is secured at its upper end by means of a screw 144. Each post is drilled transversely to provide eleven holes in each of which a sliding index-pin is positioned. The lowermost pin of the series is designated $145^1$, the second $145^2$ and so on up to the uppermost pin which is designated $145^{11}$. These pins are mounted to slide in the holes in the posts 141 but to prevent them from sliding too freely a plurality of coil springs 146 are positioned on each post, each arranged to react against two of the sliding pins and therefore exert just enough pressure on them so that they can be forced to slide but will not be jarred or vibrated out of the position to which they are intentionally moved.

The hub 86 carries an upright post 147 which rotates with the hub. Surrounding the post 147 and arranged coaxially therewith is a cylinder 148 made of some material that is a non-conductor of electricity. The cylinder 148 has upper and lower end discs 149. A brace 150 is secured at one end to the upper disc 149 and at its other end to a stationary part of the frame, such as the frame work which supports the pin-setting solenoids hereinafter described. This brace serves to steady the cylinder 148 and prevents it from rotating. Each end disc of the cylinder has a central opening through which the rotating post 147 passes, a ball bearing 151 serving to rotatably mount the post 147 at its upper and lower ends in the disc openings.

Fastened to the outer surface of the cylinder 148 are eleven curved leaf springs constituting electric contact trip fingers 152. One of these fingers is shown in Fig. 8 and in Fig. 9 only three of them are shown, the others being omitted for the sake of clearness. Each of the contact fingers may be mounted on the cylinder by means of a small bracket 153. They are mounted in a spiral series, the lowest finger being on a level with the lowermost index-pin $145^1$. Looking down on the series of contact fingers, with one set of index-pins and one receptacle in the position in which one of the index-pins may be set, the first or lowest contact finger is located 20° forward of this position corresponding to the first tripping station for the receptacle where the top of the first chute is located. The next higher contact finger is located on a level with the second index-pin $145^2$ and 20° farther around than the first thus corresponding to the second tripping station for the receptacle where the top of the second chute is located, and so on. Each contact finger is so arranged that when the index-pin that is on the same level with it has been set, i. e., has been moved to its extreme inward position, as is the case pith pin $145^9$ in Fig. 8, the end of the pin will make wiping contact with the upper surface of the contact finger. However, when the pin is in its normal position it will pass by the contact finger without engaging it. All of the contact fingers 152 are electrically connected in series by means of a conductor (shown at 154 in the wiring diagram, Fig. 14). This conductor is connected to one end of the secondary coil 155 of a transformer (Fig. 14). A conductor 156 connects the other end of this transformer coil with a brush 157 mounted on the cylinder 148 as shown in Fig. 8. This brush makes contact with a brush ring 158 carried by the hub 86 but insulated from it by an insulating bushing 159.

One of the leads from the solenoid 107 on each receptacle is plugged into the corresponding post 141 as indicated at 160 in Fig. 8. The other lead from the solenoid is plugged into the brush ring 158 as indicated at 161. Thus when the primary 162 of the transformer (Fig. 14) is energized, as hereinafter described, the current induced in the secondary of the transformer will pass through any of the receptacle tripping solenoids to which an electric circuit happens to be completed by reason of its index-pin making contact with the corresponding contact finger on the cylinder 148. When a blank is deposited in one of the receptacles one of the index-pins associated with that receptacle is set or moved inward by one of the pin-setting solenoids, as hereinafter described, the particular pin so set depending upon the measurement of the thinnest spot along either lateral edge of the blank as determined by the gauging rolls, if, say, the ninth pin from the bottom is set when a blank is deposited in the corresponding receptacle, that pin, namely, 145⁹ will engage the particular contact finger 152 that is on a level with it when the carrier has rotated far enough for this to happen. In Fig. 8 the index-pin 145⁹ is shown thus making contact with its corresponding contact finger 152. This will complete an electric circuit from one side of the receptacle-tripping solenoid to the corresponding post 141 then through the pin 145⁹ to the contact finger 152, through the secondary coil of the transformer, then through the brush 157 to the brush ring 158, and then back to the other side of the solenoid. This will energize the solenoid to trip the bottom of the receptacle and allow the blank to drop into the chute over which the receptacle is then about to pass.

The electrical mechanism controlled by the gauging rolls and which sets the index-pins includes eleven pin-setting solenoids 163 (Figs. 8 and 9) arranged in a vertical series so that when a blank is being deposited in a receptacle on the rotary carrier the series of index-pins for that receptacle will be passing by those solenoids. It will be understood that when a series of index-pins comes opposite the series of solenoids each index-pin will be in alignment with one of the solenoid coils. The pin-setting solenoids are held between vertical bars 164 and 165 screwed to a vertical bar 166 fastened to an angle bracket 167 that is adjustably bolted to the front face of the overhanging portion 7 of the casting. Each solenoid has a composite core made up of a non-magnetic portion 168 and a magnetic portion 169. Each composite core is held in inoperative or retracted position by means of a coil spring 170. When any solenoid is energized the composite core will be moved to the left, as viewed in Fig. 9, against the action of its spring 170 and will set, or move inwardly, the index-pin which is in horizontal alignment with and which is passing by the end of this core. The energization of the solenoids 163 is controlled through a set of relays the actuation of which is in turn controlled by the gauging rolls.

Mounted in the overhanging portion 7 of the casting 6 is a shaft 171 (Figs. 4 and 9) which extends in a direction from front to rear of the machine. Two sleeves 172 of insulating material are loosely mounted on the shaft 171, each of which is rigid with a pinion 173. One of these pinions meshes with the toothed sector 64 on one of the arms 63 (oscillated by one of the upper gauging rolls) and the other pinion meshes with the toothed sector on the other arm 63 (oscillated by the other upper gauging roll). Mounted on the shaft 171 between the two sleeves 172 is a hub 174 carrying two discs 175 and 175' of insulating material. These discs carry a series of electric contact pins 176 which pass through openings in both discs and project slightly beyond the outer faces of the discs. The contact pins 176 extend circumferentially about half way around the discs. One of the sleeves 172 carries two diametrically opposite contact arms 177 and 177' which are electrically connected with each other. The outer end of the contact arm 177 rides over the end faces of the contact pins 176 at the outer side of the disc 175 while the outer end of the opposite contact arm 177' rides over a continuous contact segment 178 positioned on the outer face of the same disc 175. Similarly the other sleeve 172 carries diametrically opposite contact arms 179 and 179' which are electrically connected. The end of the arm 179 rides over the end faces of the contact pins 176 at the outer side of the disc 175' while the end of the opposite arm 179' rides over another continuous contact segment 178' positioned on the outer face of the same disc 175' (see also the wiring diagram, Fig. 14). The manner in which the movement of the contact arms over the contacts control the electric circuits will be described later.

The shaft 171 is not mounted directly in the casting 6 but each end is mounted in one end of an arm 180 which latter is pivoted intermediate its ends in the casting, as shown at 181. The other end of each arm 180 is connected to one end of a coil spring 182, the other end of which is connected to a pin 183 secured to the casting. Thus the two arms 180 constitute a swinging mounting for the shaft 171 which is adapted to swing about the axis of the pivots 181 and is biased by the coil springs 182 in such a way as to urge the two opinions 173 on the shaft 171 into contact with the teeth on the sectors 64 of the swinging arms 63. This takes up any play and avoids back lash such as might result in errors.

Referring now to the circuit diagram of Fig. 14 it will be seen that each of the contact pins 176 is connected to a conductor 184 and these conductors lead to a switchboard. The switchboard includes a series of separate conducting sections 185 each of which is provided with a lower plugging hole or jack 186. A series of upper plugging holes or jacks 187 is provided in the conducting sections 185 in such a way that half of each of the holes is formed in the edge of one section and the other half in the edge of an adjoining section. In other words, each of the upper holes is common to two adjoining conducting sections. Each of the conductors 184 is electrically connected with one of the conducting sections 185 as shown in the diagram. Eleven electric relays are provided each of which has an actuating coil 188 electrically connected at one end to a terminal post 189. Each of the terminal posts 189 has a conductor 190 connected to it that carries at its free end a plug than can be inserted into any one of the plugging holes 186 or 187. Each relay actuating coil 188 is connected at its other end to a common conductor 191 which is connected by a conductor 192 to one out-put side of a rectifier R. The other out-put side of the rectifier is connected by means of a conductor 193 to one of a pair of contacts 194 in a master controller M. The other contact of this pair is connected by means of a conductor 195 to the contact segments 178 and 178' over which the ends of contact arms 177' and 179' move.

Each relay has a holding coil 196. When any relay is operated it moves an arm 197 into engagement with a contact 198 to thereby complete a circuit through its own holding coil as follows: From the rectifier R through conductor 193 thence through a conductor 199 to one of a pair of contacts 200 in the master controller. Assuming these contacts to be closed in the master controller the circuit continues through conductor 201 to the holding coil of the relay, through the holding coil to contact 198, and thence through the arm 197 and conductor 192 back to the rectifier. As shown in the diagram conductor 201 is connected to the holding coils of all the relays. It should be noted at this point that when any relay is operated, the arm 197 in moving to close the circuit through its holding coil moves away from a contact 202 thus breaking the circuit to any and all holding coils to the right of that relay as viewed in Fig. 14. The third relay from the left in Fig. 14 is shown in a closed position. The arms 197 of the first two relays help to complete the circuit to its holding coil because the first two relays are open and the arms 197 are in engagement with the lower contacts 202. However, no current will be supplied to the holding coils of any relays to the right of the one that is closed because the circuit of all of these other holding coils is interrupted by reason of the fact that the arm 197 of the closed relay is out of engagement with the lower contact 202. Hence, when any relay is closed it will deenergize the holding coil of any relay which is higher in the series, i. e., to the right of it (as viewed in Fig. 14), but no relay when closed will remain closed if there happens to be a closed relay which is lower in the series, i. e., to the left of it (as viewed in Fig. 14). Hence the only relay that remains closed at the end of a gauging operation is the lowest one in the series that is energized during the gauging of the blank, i. e., the one which is energized when either of the arms 177 or 179 engages the contact which happens to be the lowest one in its series reached by the arms during the gauging operation. The significance of this will appear later.

When any relay is closed, such for instance as the third one from the left (as viewed in Fig. 14), it closes a pair of contacts 203 connected in series with one of the pin-setting solenoids 163, the circuit being as follows: From the right hand contact 203 through the coil of the pin-setting solenoid 163, through conductor 204 to one of a pair of contacts 205 in the master controller, and assuming these contacts to be bridged, from the other of such contacts, through a conductor 206 to the conductor 193, then through rectifier R, and through conductor 192 to the left hand contact 203. This closing of the contacts 203 by a relay will not of itself energize the corresponding pin-setting solenoid 163. None of these solenoids will be energized until later on when the master controller closes the contacts 205, and then the only one which will be energized is the one which is controlled by the particular relay which remains closed at the end of the gauging operation.

It will be noted that the contacts 198 and 202 associated with the holding coil of each relay are of the "make before break" type. That is, when the arm 197 moves upwardly (as viewed in Fig. 14) it will engage the contact 198 before it moves out of engagement with the contact 202. If these contacts were not of the "make before break" type difficulty might be encountered if one of the contact arms moving over the contacts 176 should engage one of these contacts for a duration of time less than that required to operate one of the relays. If the contacts 198 and 202 were of the "break before make" type and if a current were sent through the actuating coil of a relay for less than the full "operate" time of the relay it might break the circuit to the holding coil of a closed relay to the right of it (as viewed in Fig. 14) without fully establishing its own holding circuit. Both relays would thus drop out and no index-pin would be set. By making the contacts 198 and 202 of the "make before break" type, this action cannot take place.

The master controller is shown in Figs. 1, 2, 3 and 8. It is mounted at the rear of the machine on a plate 208 which spans the vertical plates 4 and 5 and is supported on them by means of brackets 209. The master controller is operated from the carrier-actuating shaft 95' by means of a chain 210 passing over a sprocket 211 on the rear end of this shaft.

All of the details of the mechanism within the master controller have not been illustrated because it is sufficient to know that the master controller may be of a type whose main shaft has a number of adjustable cams which actuate contact arms to open and close the contacts within the controller. One of the cams and the contact arm which it actuates are shown in perspective in Fig. 15. The contact arm $a$ is pivotally mounted at $b$. At its upper end the contact arm carries a bridge piece $c$ which is adapted to bridge a pair of contacts $d$ (which might be any pair of the contacts 194, 200, 205 or 238 shown in the diagram of the master controller, Fig. 14) when the arm is in its operative position, and to open these contacts when the arm is in its inoperative position. At the lower end the arm carries a cam roller $e$ adapted to be actuated by a cam on the cam shaft $f$. The cam may comprise a disc $g$ to which a pair of adjustable segments $h$ are attached. Each of these segments has a cam projection $i$ and is circumferentially slotted as shown at $j$. The disc $g$ is provided with a circumferential series of openings $k$. By this arrangement it is obvious that the two segments may be bolted to the disc $g$ at any of the openings $k$ in the disc and therefore positioned at any desired place circumferentially of the disc. Moreover, the slots $j$ allow the segments to be adjusted relative to each other circumferentially of the disc to vary the effective circumferential length of the cam projections. The contact arm $a$ is normally retained in its operative position (in which the contacts $d$ are bridged) by a coil spring $l$ and is moved to its inoperative position to open the contacts when the cam projections $i$ engage the roller $e$. It is obvious that a controller of this type permits adjustment of the time at which each circuit is opened and closed, the length of time that it remains open, and the length of time that it remains closed. Of course, the segments on all of the discs within the controller do not have to have cam projections of the same circumferential length. For instance, where a circuit controlled by one of the cams is to remain open during the greater part of one revolution of the cam the projections on that cam may have a much longer circumferential length than shown in Fig. 15.

The source of power for the machine is a motor 212 supported by means of a bracket 213 on the outer surface of the vertical plate 5 (Figs. 1, 2 and 3). The motor drives a shaft on which is mounted a pulley 214. A belt 215 passes over this pulley and over a pulley 216 on a drive shaft 217 journaled in the casting and extending in a direction from front to rear of the machine. At the rear of the casting 6 this shaft removably carries a gear 218 (see particularly Figs. 1 and 8) which meshes with a gear 219 removably mounted just below it on a stub shaft 220. This stub shaft also carries a gear 221 permanently fastened to it. This gear through an intermediate idler gear 222 drives a gear 223 mounted on the carrier-actuating shaft 95'. It is this chain of gearing that rotates the carrier and rotates the shaft of the master controller M.

The innermost gear 221 on the stub shaft 220 also meshes with another idler gear 224 which in turn meshes with a gear 225 on the cam stub shaft 76. In this way the cam 75 that raises and lowers the upper gauging rolls is rotated.

At the forward end of the overhanging portion 7 of the casting 6 the drive shaft 217 is provided with a gear 226 which meshes with a gear 227 on the chain sprocket shaft 58 and with a gear 228 on the shaft 58 which carries the lower gauging rolls. Thus rotation is imparted from the shaft 217 both to the sprocket that drives the feed chain and the lower gauging rolls. The extreme rear end of the drive shaft 217 is provided with a hand wheel 229 which is useful when it is desired to turn the machine over by hand to adjust the various parts to the correct timing especially the cams in the master controller.

The removable gears 218 and 219 on the drive shaft 217 and stub shaft 220 respectively constitute timing gears. By removing these gears and substituting gears having a different ratio, the carrier, the master controller, and the cam that raises and lowers the upper gauging rolls, may all be operated at a faster or slower speed because these parts are all operated through the two timing gears. However, the feed chain and the lower gauging rolls, being actuated directly from the shaft 217 and not through the timing gears, operate at a constant speed which is not affected when the timing gears are changed. These timing gears constitute the means hereinbefore referred to for changing the speed of rotation of the carrier and simultaneously changing the speed of operation of the mechanism for raising and lowering the upper gauging rolls.

The motor 212 may be an alternating current motor adapted to run on 220 volts. As shown in Fig. 14 the motor may be connected to a three-phase 220 volt power line 230. A contactor 231 controls the supply of current to the motor and to the various circuits. Single phase lines 232 and 233 are connected to the primary coil 234 of a transformer, the secondary coil 235 of which is connected to the input of the rectifier R hereinbefore referred to. Other single phase lines 236 and 237 are connected to the primary coil 162 of the receptacle-tripping transformer hereinbefore referred to. In series with the coil are a pair of contacts 238 in the master controller. This circuit constitutes part of the "trip" circuit and when closed by the master controller causes those receptacles on the carrier to trip whose solenoid circuits happen at that time to be completed through the set index-pins and corresponding contact fingers 152. The separate transformer 155—162 is used for the tripping load because alternating current is satisfactory for the tripping solenoids on the receptacles and by using this separate transformer arcing at the controller contacts may be reduced because they can be located in the circuit containing the transformer primary.

In operation, the machine is first placed in readiness to handle the particular type of blanks which it is desired to gauge and sort. If it is desired to sort ladies' taps which are usually about 6" long and approximately 3½" wide, the side walls of the hopper, the guide plates 80, the side walls of the receptacles on the carrier, the side walls of the chutes, and the side walls of the bins are all adjusted as hereinbefore described to accommodate the taps of 3½" width. The feed dogs are so positioned on the chain that the spacing between them is eight inches. In this connection it might be stated that it has been found advisable to employ a feed chain about four feet long. Thus when the spacing between the dogs is eight inches there will be six dogs on the chain. If men's heels were being sorted twelve dogs would be used with a spacing between them of four inches. For short soles four dogs would be used with a spacing of twelve inches and for long soles three dogs would be used with a spacing of sixteen inches. It will thus be seen that in the case of the shorter blanks, such as taps, the blanks will be fed through the machine in more rapid succession than the longer blanks. Therefore in placing the machine in readiness to sort taps, timing gears (218 and 219) are used whose size will produce the proper speed of operation of the rotary carrier and the mechanism for raising and lowering the upper gauging rolls. It so happens that for the particular machine illustrated in the drawings the two timing gears 218 and 219 should be the same size (3¾" in diameter) to accomplish this result. For the particular machine shown in the drawings when men's heels are being sorted with a four inch dog spacing the timing gears 218 and 219 should be 5" and 2½" in diameter, respectively; when short soles are being sorted with a twelve inch dog spacing they should be 3" and 4½" in diameter, respectively; and when long soles are being sorted with a sixteen inch dog spacing they should be 2½" and 5" in diameter, respectively.

In the particular machine illustrated, the parts are so arranged that when one of the upper gauging rolls is in contact with a portion of the blank which is approximately three irons in thickness the corresponding contact arm operated by it will be in engagement with the uppermost contact 176 in Fig. 14. This contact is the lowest one in the numerical series. The conducting section 185 to which this contact is electrically connected is therefore marked "3" (meaning 3 irons) and this conducting section may therefore be regarded as the lowest in its numerical series. Likewise if one of the upper gauging rolls is in contact with a portion of the blank which happens to be about three and one half irons in thickness the corresponding contact arm will be in engagement with the next contact 176 of the series and therefore the second conducting section 185 electrically connected with that contact has been marked "3½" (meaning 3½ irons). Similarly the third conducting section 185 has been marked "4" and so on up the scale by half irons.

The first relay in the series is marked "lights" because it controls the pin-setting solenoid that sets the lowest index-pin of a series of such pins and therefore causes any blanks deposited in the corresponding receptacle to be discharged at the first chute, and this chute is preferably reserved for all "light" blanks, i. e., the ones which are too thin at the thinnest portion to be usable. The second relay in the series is marked "5½" because it is shown plugged into the 5½ iron conducting section. It controls the pin-setting solenoid which is adapted to set the second index-pin from the bottom in any series of such pins and thereby cause a blank carried in the corresponding receptacle to be discharged at the second chute. Similarly the third relay is marked "6" because it is shown plugged into the 6 iron conducting section. It controls the pin-setting solenoid which is adapted to set the third index-pin from the bottom in any series of such pins and thereby cause a blank carried in the corresponding receptacle to be discharged at the third chute, and so on up to the last relay in the series which is marked "10." This relay controls the pin-setting solenoid which is adapted to set the highest index-pin (the eleventh from the bottom) in any series of such pins, thereby causing a blank carried in a corresponding receptacle to be discharged at the eleventh chute, i. e., next to the last chute.

Let it be assumed that it is desired to sort women's taps by half irons. The ones measuring less than 5½ irons at the thinnest portion are ordinarily not usable. They constitute the so-called "lights." Therefore, the first five conducting sections 185 are bridged or short-circuited by inserting four dummy plugs into the first four of the upper jacks or plugging holes, as indicated in Fig. 14. The first relay is plugged into the lower jack in the first conducting section, and is thereby electrically connected to the whole group of bridged conducting sections so that all "light" taps will cause energization of this relay. The second relay is plugged into the lower jack of the 5½ iron section. The third relay is plugged into the lower jack of the 6 iron section. The next relay is plugged into the lower jack of the 6½ iron section, and so on. With the connections thus made, any tap which measures less than 5½ irons at its thinnest portion will cause the first relay to be energized and remain closed to cause delivery of such blank into the first chute and first bin which thus collects all the "light" or unusable blanks. Any tap which measures from 5½ to 6 irons at its thinnest portion will energize the second relay which will remain closed to cause such tap to be deposited in the second chute and second bin which thus collects the taps ranging in thickness from 5½ to 6 irons measured at the thinnest portion of each. Similarly taps ranging in thickness from 6 to 6½ irons measured at the thinnest portion of each will be delivered to the third bin, and so on.

The hopper is filled with taps to be sorted preferably positioned therein with the heel end pointing downward. As each dog on the feed chain passes by the hopper it carries along with it the lowermost tap and moves it first under the spring fingers 55 and then delivers it to the gauging rolls. When the forward or leading end of the tap is approximately an eighth of an inch between the gauging rolls the cam 75 allows the upper gauging rolls to start dropping. They will come into engagement with the lateral edges of the tap at about one half or three quarters of an inch behind its forward edge. When about an inch of the tap is through the gauging rolls the "gauge" contacts 194 in the master controller are closed and this renders the gauging circuit operative to actuate the relays. Assume that the tap being gauged is 4 irons in thickness at its thinnest point. Also assume that this tap is 7 irons thick throughout about the first half of its length then drops to a low spot of 4 irons thickness, then back to say 9 irons thickness before the gauging circuit is broken. When the gauging circuit is first closed the 7 iron relay will be actuated causing energization of its own holding coil and closing the contacts in series with the corresponding pin-setting solenoid. However, this solenoid is not energized at this time because the "register" circuit is open at the master controller. As the tap continues to move through the gauging rolls they will then encounter the thin portion of 4 irons thickness. The first or "light" relay will then be energized because the contact arm now engages the third contact 176 and this contact is electrically connected to this relay. It will be noted that even if this thin portion had been as thick as 5 irons the first relay would have been energized in a similar manner. Now when the first relay closes it breaks the holding circuit to the 7 iron relay which was previously operated and hence that relay now opens. When the portion of the tap that is 9 irons in thickness subsequently passes through the gauging rolls the 9 iron relay will be energized but it will fail to hold because the circuit to its holding coil is still broken at the first relay. When there is still about one inch more of the tap to pass through the gauging rolls the "gauge" circuit is broken at the master controller. When there is about half an inch more of the tap to pass between the gauging rolls the cam 75 lifts the upper gauging rolls off the tap. The tap which has been positively fed forward during the gauging operation, not only by the feed chain but also by the positively driven lower gauging rolls, is then discharged by the feed chain and slides down the guide plates 80 and then drops into whatever receptacle on the carrier happens to be passing under the guide at that time. At about the time that the tap drops into the receptacle the "register" circuit is closed at the master controller, and this sends an impulse through the coil of the lowest pin-setting solenoid 163, this being the solenoid that was selected for operation when relay No. 1 was closed. The series of index-pins associated with the receptacle into which the tap is dropping is now passing by the vertical series of pin-setting solenoids and therefore when the lowest of these solenoids is energized as just described the lowest index-pin in this series is set or moved inwardly.

This registration impulse need be only a momentary one, long enough for the solenoid to set the index-pin and therefore the master controller immediately reopens the "register" circuit. The tap now in the receptacle will be rotated with the carrier but the index-pin that has been set (the lowest one in the series) soon engages the first or lowest contact finger on the cylinder 148. While the set index-pin is moving in engagement with its contact finger the "trip" circuit is closed at the master controller thus energizing the primary coil 162 of the transformer in the "trip" circuit (Fig. 14). This will induce a current in the secondary coil 155 of this transformer which will pass through the tripping solenoid on the receptacle that has brought the tap to the first chute because the circuit to this solenoid is completed through the set index-pin and the lowermost contact finger. Energization of the solenoid will trip the bottom of the receptacle and allow the tap to drop by gravity into the first chute down which it slides to the first bin. Incidentally when the "trip" circuit is closed at the master controller every receptacle is tripped whose set index-pin is at the time making wiping contact with one of the contact fingers 152 on the cylinder 148. The closing of the "trip" circuit by the master controller is also momentary. The trip contact fingers 152 are long enough circumferentially of the drum 148 to allow for adjustment at the master controller of the exact time at which the tripping impulse is applied.

The "hold" circuit for the relays is opened by the master controller immediately after the registartion impulse is sent through the coil of the pin-setting solenoid. This restores the closed relay to its normal condition whereupon the "hold" circuit is immediately closed by the master controller.

As a further illustration let it be assumed that a tap is 6 irons in thickness at its thinnest portion. The 6 iron relay will be energized when the portion of the tap having this thickness passes through the gauging rolls. The 6 iron relay will be the only one that remains closed so that when the master controller closes the "Register" circuit the third pin-setting solenoid from the bottom will be the only one to be energized when the tap is dropped into a receptacle. Therefore, this pin-setting solenoid will set the third index-pin from the bottom of that series which is associated with the receptacle into which the tap drops. The tap will be discharged when the carrier is rotated far enough to bring the set index-pin into engagement with the trip contact finger on the same horizontal level with it, namely, the third one from the bottom and therefore the tap will be discharged into the third chute and into the third bin which collects all taps which measure from 6 up to 6½ irons at their thinnest portion.

It will be understood that each receptacle as it is passing under the guide plates 80 receives a blank that has been gauged and therefore during the rotation of the carrier a number of the receptacles may be tripped at each tripping impulse to discharge the blanks from them. The distance any particular receptacle will travel before discharging its blank will, of course, depend upon which of the index-pins associated with that receptacle has been set as a result of the gauging of the particular blank which the receptacle is carrying.

Just before each vertical series of index-pins reaches the column of pin-setting solenoids it passes by a cam plate 239 mounted on the cylinder 148 and so arranged that any pin that has been set, i. e., moved inwardly, will be moved outwardly again and restored to its normal position.

Just before each receptacle on the rotary carrier passes under the guide plates 80 to receive a blank it passes over a spring cam finger 240 mounted on top of the bracket 91 (Figs. 1 and 8). This cam finger engages the open bottom of the receptacle and swings it up to its closed latched position. It is long enough in the direction of movement of the receptacle to still be in engagement with the bottom of the receptacle when a blank drops into the receptacle. This prevents heavy pieces of leather from jarring the bottom of the receptacle open when they drop into the receptacle.

It will be recalled that there are twelve chutes and twelve bins but only eleven index-pins in each series and eleven pin-setting solenoids, relays, etc. The reason for this is that the receptacles are tripped electrically at any one of the first eleven chutes, but are tripped mechanically at the last chute. For this purpose there is arranged at the last chute a cam 241 (Fig. 3) to mechanically trip the bottom of any receptacle that has not been tripped up to this time. As the carrier rotates, the cam 241 engages with the outwardly flared portion 115 (Figs. 10 and 11) of any latch 104 which has not been previously tripped to now trip it and release the bottom of the receptacle mechanically just as the solenoid releases it electrically. Any blank which should have been electrically discharged from its receptacle before it reached the last chute, but which was not discharged for some reason such as faulty operation of some part, will be mechanically discharged at the last chute. Likewise any blank which is too thick at the thinnest portion to come within the thickness range for which the machine is set to operate will be mechanically discharged at the last chute.

It will be observed from Fig. 14 that some of the electric contacts 176, and some of the conducting sections 185, at the high end of the series, are not connected to any of the relays. They represent measurements above 10 or 10½ irons and any blank which is thicker than that at its thinnest portion will be mechanically discharged from its receptacle into the last "catch-all" chute. Hence there is no necessity of connecting these higher contacts with the relays unless it is desired to electrically sort blanks which measure more than 10½ irons at the thinnest portion.

It should be noted that inasmuch as the opposite lateral edges of the blanks are independently gauged, the blanks are sorted in accordance with the measurement of the thinnest spot along either of the lateral edges. This will be clear from Fig. 14 from which it will be seen that the lowest relay in the series energized during the gauging of a blank (the one that remains closed) is the one which corresponds with the lowest contact in the series reached by either of the contact arms 177 or 179 (actuated independently by the two upper gauging rolls). In other words, the particular contact arm that reaches the lowest contact is the controlling one and selects the relay which turns out to be the controlling one.

It will also be observed from Fig. 14 that the switchboard makes it possible to sort the blanks either by half irons, as in examples already given, or by whole irons. In the latter case the conductors 190 would be plugged into certain of the upper plugging holes or jacks instead of into the lower ones. The first conductor 190 could remain plugged into the lower jack of the first conducting section 185 or into any one of the upper jacks shown occupied by the dummy plugs as the operation would be the same. The conductor from the 5½ iron terminal 189 would be plugged into the upper jack between the 5½ and 6 iron conducting sections. The conductor from the 6 iron terminal 189 would be plugged into the upper jack between the 6½ and 7 iron sections and so on. Therefore, not only would the second bin receive blanks which measure at their thinnest portion from 5½ to 6 irons but also those which measure from 6 to 6½ irons. Likewise, the third bin would receive all blanks that measure at their thinnest portion from 6½ to 7½ irons.

In the illustration just given, all of the blanks (except those going to the last catch-all chute) would be distributed among the first six chutes and bins because the first six conductors 190 are plugged into the jacks. It is obvious, however, that the bins to which the blanks go will be determined by which conductors 190 are used and how they are plugged into the jacks, this being true regardless of whether they are plugged into the upper jacks or the lower ones.

The method of testing the accuracy of the machine is to measure a pile of twenty-four sorted blanks since they are sold on this basis. For instance, a pile of twenty-four sorted blanks, each of which measures 6 irons (one-eighth of an inch) at the thinnest portion, should measure about three inches in height. An attempt is made to hold the height of any pile of twenty-four sorted blanks to within one-sixteenth of an inch, plus or minus, of what is should be. To make this possible I provide means for slightly adjusting the contact discs 175—175' circumferentially. Referring to Figs. 4 and 6 the discs 175—175' carry a swivel pin 243 having threaded engagement with a rod 244 which extends towards the side wall of the overhanging portion 7 of the casting 6. On the outer face of this portion of the casting there is rotatably mounted an adjusting dial 245 to which the rod 244 is operatively connected. The dial 245 is provided with a circular series of openings 247 any one of which is adapted to register with a tapped hole in the wall of the casting. Thus after the dial is turned to make an adjustment it may be locked in its adjusted position by means of a pin 246 having a shank which passes freely through one of the holes 247, and having a threaded extremity adapted to be screwed into the tapped hole in the casting. When the dial 245 is turned to adjust the position of the discs 175—175', the series of contacts 176 is shifted slightly in the direction in which the contact arms move over them, i. e., circumferentially of the discs 175—175'. This will cause the blanks deposited in say, the 6 iron bin, to be actually slightly greater or less than 6 irons at their thinnest portion depending upon the direction in which the contact discs are adjusted, and this correction will, of course, apply to the blanks deposited in all of the other bins. The very fine adjustment of the contact discs 175—175' necessary to hold the height of a pile of twenty-four sorted blanks to within one-sixteenth of an inch of what it should be is made possible by the large reduction ratio between the adjusting dial and the contact discs.

Where ever reference is made in the foregoing description or in the claims to the "lowest" contact 176, conducting section 185, or relay in a series I do not necessarily mean the lowest as determined by its vertical position or elevation. I mean the lowest from the standpoint of its rank in the numerical series. In fact, a series of the devices mentioned might be evaluated or numbered in the series in a direction opposite to that employed herein, and what I means by "lowest" in the series might in the reversed arrangement be the highest in the series. Also where the claims refer to "electro-magnetic devices" which might be either the relays or the pin-setting solenoids, the above meaning of the word "lowest" is intended.

Figure 16 illustrates a modification of a portion of the electrical system shown in Fig. 14 according to which all relays that are closed during movement of the contact arms 177 and 179 over the contacts 176 will remain closed. As will be seen from the circuit connections in this figure, when any relay is operated, the holding coil 196 of that relay is energized as previously described but when the circuit to the holding coil of one relay is completed it has no effect on the holding coils of the other relays. Therefore, at the completion of the gauging operation a number of the relays may be in the closed condition and therefore when the master controller closes the "register" circuit a corresponding number of the pin-setting solenoids 163 will be energized. Consequently, a corresponding number of index-pins will be set when a blank is deposited in one of the receptacles but the pin that determines the station or chute at which the blank will be discharged is the lowest pin in the series that is set, because it will be the first of the set pins to make contact with a tripping contact finger. The other set index-pins will, of course, each cause a subsequent energization of the tripping solenoid of the receptacle when it reaches other chutes but such energization will be useless because the blank will have been already discharged from the receptacle.

Fig. 17 illustrates a further modification of a part of the electrical system according to which no relays at all are employed. The plugging conductors 190 are connected directly to the pin-setting solenoids 163. In this arrangement the "hold" circuit and "register" circuit are not required. The master controller need control only the "trip" circuit and the "gauge" circuit, as shown in Fig. 17. During the gauging of the blank the pin-setting solenoids 163 will be selectively energized. When this type of electrical system is employed it is advisable to fasten to the pin-setting end of each solenoid core a striking piece 242 which is elongated horizontally, as shown in Fig. 18. During the interval of time that the pin-setting solenoids are being selectively energized throughout the gauging period of a blank, the index-pins that are to be set for that blank travel an appreciable distance but the length of the striking pieces 242 is sufficient to cause each solenoid when energized to set one of the index-pins at any time while the column of pins is moving within the range of operation of the elongated striking pieces. As in the case of the modification illustrated in Fig. 16 more than one index-pin may be set for each blank but the one that will determine the particular chute into which the blank will be discharged will be the lowest pin of the series that has been set.

Both of the modifications just described are probably less efficient than the system illustrated in Fig. 14 because several index-pins may be set for any blank and there may be useless energization of the tripping solenoid on the carrier-receptacle in which that blank has been deposited after the blank has been discharged from it into one of the chutes. Moreover, the systems in which relays are employed (illustrated in Figs. 14 and 16) are preferred over the non-relay system illustrated in Fig. 17 because the relays are so quick in their operation that each of them is capable of closing in the brief interval its actuating coil is energized. That interval is likely to be very short due to the rapidity with which the arms 177 and 179 may move over their contacts. The pin-setting solenoids are more sluggish in their operation and therefore in my high-speed machine are not so well adapted for direct connection to the contacts 176.

While the machine was designed to sort leather blanks in accordance with the measurement of the thinnest spot on each of them, nevertheless it could also be used, with minor alterations, to sort them in accordance with the measurement of the thickest spot on them, should it ever be desirable to do so. For instance, if the contact arms 177 and 179 were caused to move toward the lowest contact in the series when the upper gauging rolls move upwardly, instead of downwardly as previously described, the blanks would be sorted in accordance with the measurement of the thickest spot on each of them. This could also be accomplished by reversing the electrical connections between the contacts 176 and the conducting sections 185, i. e., so that the lowest or first contact in the series is connected with the last conducting section and the last contact is connected with the first conducting section, and so on. The same result might be obtained by so plugging the conductors 190 into the jacks that the relay which remains closed at the end of a gauging operation, i. e., the lowest one in the series that is energized during the gauging operation will be the one that is energized when either of the arms 177 or 179 reaches, during the gauging operation, the highest point in the series of contacts instead of the lowest point as previously described.

My machine is capable of gauging and sorting heels, taps, soles or counters, many times faster than any machine now available for the purpose. The blanks may be made to move through the machine very fast and in rapid succession, all parts being designed to facilitate this. For instance, the feed chain and carrier, which constitute the moving blank-conveying parts of the assembly move continuously and in one direction only in a closed circuit rather than with a reciprocating or intermittent motion. The movement of the blanks is continuous from the time they leave the hopper until the time they are deposited in the bins. The blanks are always moved in the direction of their longitudinal axis except in the rotary carrier in which their movement might be termed "face-on," and the various parts are so constructed that during the travel of the blanks through the machine, turning of the blanks end for end or upside down is guarded against. Therefore the blanks stack up in the bins all with the same side up. This is important because subsequent to the sorting of the blanks, operations are usually performed on their flesh side such as skiving or sanding.

The gauging mechanism is of a type that is adapted to gauge the blanks while they are in motion, but more than this it is adapted to gauge them while they are moving quite rapidly, the upper movable gauging rolls being unencumbered with any kind of driving mechanism which would defeat this purpose, and they being called upon to move only light and readily movable parts. The means for setting the stationable parts. The means for setting the station selecting mechanism, being electrical, has a close cooperation with the gauging mechanism that gauges the blanks progressively and speedily, because it too is fast operating. The electrical system is particularly fast operating and reliable when it is of the relay type, and the relay-type system makes the machine particularly efficient when one relay only remains closed at the end of the gauging operation and thus preserves or "remembers" the lowest contact in the series reached by either of the contact arms during the gauging of a blank.

The machine is more universal than other machines of its type because the adjustability of the various parts makes it possible to convert it from a machine for sorting leather blanks of one type into a machine for sorting leather blanks of any one of a number of other types. Moreover, the switchboard provides flexibility in making it possible to sort blanks either by half irons or whole irons, and also in making it possible to select certain bins for delivery thereto of the sorted blanks.

I claim:

1. Apparatus for grading and sorting leather comprising gauging mechanism adapted to progressively gauge every point along at least a part of the length of the edge of a moving leather blank, and electrically controlled sorting mechanism to sort the gauged blanks in accordance with the measurement of the thinnest spot as determined by the gauging mechanism, said sorting mechanism including relays which are selectively closed as the gauging mechanism responds to the variations in thickness of the blank, an electrical device for each relay adapted to be energized when current passes across the contacts of the relay, the place at which the gauged blank is delivered depending upon which of said electrical devices is energized, and means whereby the only relay which remains closed after actuation is the one which is energized when the gauging mechanism detects the thinnest spot of the blank thereby selecting the corresponding electrical device for energization.

2. Apparatus for grading and sorting leather comprising gauging mechanism adapted to progressively gauge every point along at least a part of the length of the edge of a moving leather blank, and electrically controlled sorting mechanism to sort the gauged blanks in accordance with the measurement of the thinnest spot as determined by the gauging mechanism, said sorting mechanism including relays which are selectively closed as the gauging mechanism responds to the variations in thickness of the blank, an electrical device for each relay adapted to be energized when current passes across the contacts of the relay, the place at which the gauged blank is delivered depending upon which of said electrical devices is energized, and holding circuits for said relays arranged to hold closed only that relay which is energized when the gauging mechanism detects the thinnest spot of the blank whereby the corresponding electrical device is selected for energization.

3. Apparatus for grading and sorting leather comprising gauging mechanism to progressively gauge every point along at least a part of the length of the edge of a leather blank, and electrically controlled sorting mechanism to sort the gauged blanks in accordance with the measurement of the thinnest spot as determined by the gauging mechanism, said sorting mechanism including a series of relays which are selectively closed as the gauging mechanism responds to the variations in thickness of the blank, an electrical device for each relay adapted to be energized when current passes across the contacts of the relay, the place at which the gauged blank is delivered depending upon which of said electrical devices is energized, and holding circuits for said relays such that each relay when closed opens any previously closed relay which is higher in the series, and any relay when closed will not remain closed if there is already a closed relay lower in the series whereby the electrical device corresponding with the relay that remains closed at the end of the gauging operation is selected for energization.

4. Apparatus for grading and sorting leather comprising gauging mechanism adapted to progressively gauge every point along at least a part of the length of the edge of a moving leather blank, and electrically controlled sorting mechanism to sort the gauged blanks in accordance with the measurement of the thinnest spot as determined by the gauging mechanism, said sorting mechanism including selecting mechanism the setting of which determines the place at which the gauged blank is delivered, a plurality of solenoids for setting said selecting mechanism, a plurality of relays each having a pair of contacts in circuit with one of said solenoids, means for selectively closing said relays as the gauging mechanism responds to the variations in thickness of the blank, and means whereby the only relay which remains closed after actuation is the one which is energized when the gauging mechanism detects the thinnest spot of the blank thereby selecting the corresponding solenoid for energization.

5. Apparatus for grading and sorting leather comprising gauging mechanism adapted to progressively gauge every point along at least a part of the length of the edge of a moving leather blank, and electrically controlled sorting mechanism to sort the gauged blanks in accordance with the measurement of the thinnest spot as determined by the gauging mechanism, said sorting mechanism including relays which are selectively closed as the gauging mechanism responds to the variations in thickness of the blank, an electrical device for each relay adapted to be energized when the contacts of the relay are closed and the circuit of the electrical device is otherwise completed, the place at which the gauged blank is delivered depending upon which of said electrical devices is energized, means whereby the only relay which remains closed after actuation is the one which is energized when the gauging mechanism detects the thinnest spot of the blank, and means operating after completion of the gauging operation for completing the circuit in which are located the contacts of the relay which thus remains closed whereby an electric current passes through the electrical device associated with the contacts of that relay.

6. Apparatus for grading and sorting leather comprising gauging mechanism to progressively gauge every point along at least a part of the length of the edge of a leather blank, and electrically controlled sorting mechanism to sort the gauged blanks in accordance with the measurement of the thinnest spot as determined by the gauging mechanism, said sorting mechanism including an arm adapted to be oscillated by said gauging mechanism as the latter responds to the variations in thickness of the blank, a series of electric contacts over which said arm oscillates, relays having actuating coils electrically connected with said contacts and adapted to be selectively energized to close them as the arm moves over the contacts, an electrical device for each relay adapted to be energized when current passes across the contacts of the relay, the place at which the gauged blank is delivered depending upon which of said electrical devices is energized, and means whereby the only relay which remains closed after actuation is the one which is energized when the gauging mechanism detects the thinnest spot of the blank thereby selecting the corresponding electrical device for energization.

7. Apparatus for grading and sorting leather comprising gauging mechanism to progressively gauge every point along at least a part of the length of the edge of a leather blank, and electrically controlled sorting mechanism to sort the gauged blanks in accordance with the measurement of the thinnest spot as determined by the gauging mechanism, said sorting mechanism including an arm adapted to be oscillated by said gauging mechanism as the latter responds to the variations in thickness of the blank, a series of electric contacts over which said arm oscillates, relays having actuating coils electrically connected with said contacts and adapted to be selectively energized to close them as the arm moves over the contacts, an electrical device for each relay adapted to be energized when current passes across the contacts of the relay, the place at which the gauged blank is delivered depending upon which of said electrical devices is energized, and holding circuits for said relays arranged to hold closed only that relay which is energized when the gauging mechanism detects the thinnest spot of the blank whereby the corresponding electrical device is selected for energization 8. Apparatus for grading and sorting leather comprising gauging mechanism having independently responsive gauging elements adapted to progressively gauge opposite edges of a leather blank and electrically controlled sorting mechanism to sort the gauged blanks in accordance with the measurement of the thinnest spot along either of said opposite edges as detected by said independently responsive gauging elements during the gauging operation, said sorting mechanism including a pair of independently movable arms each adapted to be oscillated by one of said gauging elements as said element responds to the variations in thickness of the blank, two series of electric contacts one for each of said arms and over which it moves, relays having actuating coils electrically connected with said contacts and adapted to be selectively energized to close them as said arms move over the contacts, an electrical device for each relay adapted to be energized when current passes across the contacts of the relay, the place at which the gauged blank is delivered depending upon which of said electrical devices is energized, and means whereby the only relay which remains closed after actuation is the one which is energized when one of said gauging elements detects the thinnest spot along either of said opposite edges of the blank thereby selecting the corresponding electrical device for energization.

9. Apparatus for grading and sorting leather comprising gauging mechanism having independently responsive gauging elements adapted to progressively gauge opposite edges of a leather blank and electrically controlled sorting mechanism to sort the gauged blanks in accordance with the measurement of the thinnest spot along either of said opposite edges as detected by said independently responsive gauging elements during the gauging operation, said sorting mechanism including a pair of independently movable arms each adapted to be oscillated by one of said gauging elements as said element responds to the variations in thickness of the blank, two series of electric contacts one for each of said arms and over which it moves, relays having actuating coils electrically connected with said contacts and adapted to be selectively energized to close them as said arms move over the contacts, an electrical device for each relay adapted to be energized when current passes across the contacts of the relay, the place at which the gauged blank is delivered depending upon which of said electrical devices is energized, and holding circuits for said relays arranged to hold closed only that relay which is energized when one of said gauging elements detects the thinnest spot along either of said opposite edges of the blank whereby the corresponding electrical device is selected for energization.

10. Apparatus for grading and sorting leather comprising means responsive to variations in the thickness of a leather blank for progressively gauging it as the blank moves in contact therewith, means for feeding leather blanks successively to the gauging means adapted to keep them moving while being gauged, a carrier to receive gauged blanks, a plurality of stations at which the blanks are discharged and among which they are distributed by the carrier, selecting mechanism the setting of which determines at which station each gauged blank shall be discharged, a series of solenoids the energization of any one of which sets the selecting mechanism, a plurality of relays each having a pair of contacts in circuit with one of said solenoids, an arm adapted to be oscillated by said gauging means as the latter responds to the variations in thickness of the blank, a series of electric contacts over which said arm oscillates and each of which is electrically connected with the actuating coil of one of the relays, holding circuits for said relays arranged to hold closed only that relay which is energized when the gauging means detects the thinnest spot of the blank, and means operating after completion of the gauging operation for completing the circuit in which are located the contacts of the relay which thus remains closed whereby an electric current passes through the corresponding solenoid to set said selecting mechanism.

11. Apparatus for grading and sorting leather comprising gauging mechanism adapted to progressively gauge every point along at least a part of the length of the edge of a moving leather blank, and electrically controlled sorting mechanism to sort the gauged blanks in accordance with the measurement of the thinnest spot as determined by the gauging mechanism, said electrically controlled sorting mechanism including an arm adapted to be oscillated by said gauging mechanism as the latter responds to the variations in thickness of the blank, a series of electric contacts over which said arm oscillates, a carrier for the blanks, said carrier having a number of blank-holders each adapted to receive a gauged blank whereby the carrier may transport a number of blanks at one time, blank-discharging means adapted when actuated to discharge a blank from a holder if one happens to be therein, a plurality of stations among which the blanks are distributed by the carrier in accordance with the measurement of the thinnest spot as determined by the gauging mechanism, and means whereby the station at which the blank-discharging means is actuated to discharge a blank from its holder depends upon the lowest contact in the series reached by said arm during the gauging of that blank.

12. Apparatus for grading and sorting leather comprising means responsive to variations in the thickness of a leather blank for progressively gauging it as the blank moves in contact therewith, a carrier to receive gauged blanks, a plurality of stations at which the blanks are discharged and among which they are distributed by the carrier, electrical tripping means for discharging each blank from the carrier at its proper station, selecting mechanism the setting of which determines at which station each blank shall be discharged from the carrier, a series of solenoids the energization of any one of which sets the selecting mechanism, a plurality of relays each having a pair of contacts in circuit with one of said solenoids, an arm adapted to be oscillated by said gauging means as the latter responds to the variations in thickness of the blank, a series of electric contacts over which said arm oscillates and each of which is electrically connected with the actuating coil of one of the relays, means whereby the only relay which remains closed after actuation is the one which is energized when the gauging means detects the thinnest spot of the blank, said means including a holding coil for each relay and an electric circuit in which said holding coils are included, and a master controller having four circuit making and breaking switches, one of which completes a circuit to said oscillating arm near the beginning of the gauging operation and opens said circuit near the end of the gauging operation, another of said switches serving to control the circuit of said holding coils such that said circuit is in a completed condition when the circuit to said oscillating arm is completed and is broken after the circuit to said oscillating arm is broken, another of said switches operating after the circuit to said oscillating arm is interrupted to complete a circuit through the contacts of the relay which remains closed and through the corresponding solenoid and thereafter to open said circuit, and the other of said switches serving to control said electrical tripping means for discharging the blanks from the carrier.

13. Apparatus in accordance with claim 12 in which each of said switches of the master controller is adjustable whereby the opening and closing of the circuits controlled by the switches may be properly timed.

14. Apparatus for grading and sorting leather comprising gauging mechanism to progressively gauge every point along at least a part of the length of the edge of a leather blank, and electrically controlled sorting mechanism to sort the gauged blanks in accordance with the measurement of the thinnest spot as determined by the gauging mechanism, said sorting mechanism including an arm adapted to be moved by said gauging mechanism as the latter responds to the variations in thickness of the blank, a series of electric contacts over which said arm moves, relays having actuating coils adapted to be electrically connected with said contacts and adapted to be selectively energized to close them as the arm moves over the contacts, and a switchboard comprising a plurality of conducting sections insulated from one another and each of which is electrically connected with one of said contacts, every two adjacent conducting sections having a common plugging hole and each of said conducting sections having its own individual plugging hole, conducting plugs adapted to be inserted in said common plugging holes, and conductors each of which is connected with the actuating coil of one of said relays and is provided with a plug adapted to be inserted in any one of said individual plugging holes.

15. Apparatus for grading and sorting leather comprising gauging mechanism, electrically controlled sorting mechanism to sort the gauged blanks in accordance with the measurement of the thinnest spot as determined by the gauging mechanism, said sorting mechanism including a rotary carrier having receptacles to receive the gauged blanks, a vertical series of slidable pins for each receptacle mounted to move with the carrier, a vertical series of electro-magnetic devices in juxtaposition with which one of said series of pins lies when the corresponding receptacle is in position to receive a gauged blank, means whereby one of said electro-magnetic devices is energized to set one of said pins the particular device so energized depending upon the measurement of the thinnest spot of the blank as determined by the gauging mechanism during the gauging operation, a plurality of discharge points among which the blanks are distributed by the carrier, and means operating as a result of the setting of said pin to discharge the blank from the corresponding receptacle at a predetermined one of said points.

16. Apparatus for grading and sorting leather comprising gauging mechanism, electrically controlled sorting mechanism to sort the gauged blanks in accordance with the measurement of the thinnest spot as determined by the gauging mechanism, said sorting mechanism including a rotary carrier having receptacles to receive the gauged blanks, a series of slidable pins for each receptacle mounted to move with the carrier, means for setting one of the pins of a series when a blank is deposited in the receptacle corresponding with that series the particular pin of the series that is set depending upon the measurement of the thinnest spot of the blank as determined by the gauging mechanism, a plurality of discharge points among which the blanks are distributed by the carrier, and means operating as a result of the setting of said pin to discharge the blank from the corresponding receptacle at a predetermined one of said points, said means comprising a stationary electric contact with which the set pin is adapted to engage when the blank arrives at the predetermined discharge point, an electric circuit in which said pin and contact are included, and electrically operated means in said circuit for discharging the blank from the receptacle when the set pin engages said contact and when said circuit is energized.

17. Apparatus in accordance with claim 15 in which the means for discharging the blank from the carrier-receptacle comprises a stationary electric contact with which the set pin is adapted to engage when the blank arrives at the predetermined discharge point, an electric circuit in which said pin and contact are included, and electrically operated means in said circuit for discharging the blank from the receptacle, when the set pin engages said contact and when said circuit is energized.

18. Apparatus in accordance with claim 16 in which the electrically operated means for discharging the blanks from the receptacles includes a plurality of electro-magnetic devices there being one for each receptacle.

19. Apparatus in accordance with claim 16 in which the electrically operated means for discharging the blanks from the receptacles includes an electro-magnetic device mounted on each receptacle.

20. Apparatus in accordance with claim 16 in which the electrically operated means for discharging the blanks from the receptacles includes an electro-magnetic device on each receptacle, a pivoted bottom on each receptacle, and a latch for normally retaining said bottom in closed position, said electro-magnetic device being adapted when energized to actuate said latch and permit the bottom of the receptacle to open and thereby discharge the blank.

21. Apparatus for grading and sorting leather comprising gauging mechanism, electrically controlled sorting mechanism to sort the gauged blanks in accordance with the measurement of the thinnest spot as determined by the gauging mechanism, said sorting mechanism including a rotary carrier having receptacles to receive the gauged blanks, a vertical series of slidable pins for each receptacle mounted to move with the carrier, a support for each series of pins, the pins and its support being electrically conductive, means for setting one of the pins in a series when a blank is deposited in the receptacle corresponding with that series, the particular pin of the series that is set depending upon the measurement of the thinnest spot of the blank as determined by the gauging mechanism, a plurality of discharge points among which the blanks are distributed by the carrier, and means operating as the result of the setting of said pin to discharge the blank from the corresponding receptacle at a predetermined one of said points, said means comprising a plurality of stationary electric contacts with one of which the set pin is adapted to engage when the blank arrives at the predetermined discharge point, an electro-magnetic device on each receptacle adapted when energized to discharge the blank therefrom, each of said electro-magnetic devices being electrically connected at one side with one of said pin supports, a brush-ring movable with the carrier and to which all of the electro-magnetic devices are connected at their other side, a stationary brush engaging said brush-ring, and a source of electric energy connected at one side to said brush and at the other side to all of said electric contacts.

22. Apparatus for grading and sorting leather blanks comprising gauging means, feeding means including an inclined support for the blanks for causing downward movement of the blanks to and by the gauging means, a rotary carrier having receptacles movable in a horizontal path by the lower end of said inclined support and arranged to be brought successively into receiving position where each may receive a blank fed downwardly to it from the inclined support, each of said receptacles having a back wall so inclined that when the receptacle is under said inclined support the back wall of the receptacle is inclined at substantially the same angle as said support and lies in an inclined plane which is substantially a continuation of the inclined plane of said support.

23. Apparatus in accordance with claim 22 having a feed hopper arranged to feed blanks successively to said feeding means and adapted to hold a stack of blanks so that the bottom one thereof is in a plane substantially parallel with the plane of said inclined support, the longitudinal axis of said hopper being inclined and substantially at right angles to the plane of said inclined support.

24. Apparatus in accordance with claim 22 in which said feeding means includes an endless feed chain the upper run of which moves the blanks downwardly along said inclined support, and a feed hopper adapted to support a stack of blanks and arranged to feed them to said support substantially in the plane thereof and having an inclined supporting surface for the blanks which is substantially at right angles with the plane of said support.

25. Apparatus for grading and sorting leather blanks comprising means to gauge the blanks, sorting means controlled by the gauging means for sorting the gauged blanks, means for feeding the blanks to and by the gauging means adapted to support them in an inclined position and cause them to move longitudinally and edgewise in a downward direction, said sorting means including a rotary carrier having receptacles movable in a horizontal path below the feeding means and arranged to be brought successively into receiving position where each may receive one of the blanks when it is fed downwardly and longitudinally into it, each of said receptacles being adapted when the blank is received to support it at the same inclination and with the longitudinal axis oriented in the same direction as when it was being moved by the feeding means, a plurality of stations at which the blanks are discharged and among which they are distributed by the carrier, and means operating to discharge each blank from its receptacle at a predetermined station and permitting the blank to drop therefrom by gravity and resume its downward longitudinal movement.

26. Apparatus in accordance with claim 25 in which the stations at which the blanks are discharged by the rotary carrier comprise chutes located below the carrier each of which is adapted to receive a blank at substantially the same inclination as that at which the blank is supported in the carrier receptacle at the time it is about to be discharged into the chute and to maintain the same orientation of the longitudinal axis of the blank.

27. Apparatus in accordance with claim 25 in which the stations at which the blanks are discharged by the rotary carrier comprise chutes located below the carrier each of which is adapted to receive a blank at substantially the same inclination as that at which the blank is supported in the carrier receptacle at the time it is about to be discharged into the chute and to maintain the same orientation of the longitudinal axis of the blank, and the longitudinal axis of each of said chutes being tangentially disposed with respect to the pitch circle of the receptacles on said carrier.

28. Apparatus for grading and sorting leather blanks comprising a gauging roll, means to feed the blanks successively to and by said roll, said roll being adapted to contact with the blank as the latter is being gauged, a member on which said gauging roll is mounted, a shaft on which said member is loosely mounted whereby the gauging roll may move bodily in response to variations in the thickness of the blank, means controlled by said bodily movement of the gauging roll for sorting the gauged blanks, means for lifting said gauging roll near the end of the gauging operation and for lowering it near the beginning of the gauging operation, said last named means comprising an element movable with said shaft adapted to abut against said member on which the gauging roll is mounted to lift the gauging roll when the shaft is turned in one direction, said element moving away from said member to permit the gauging roll to lower when said shaft is turned in the opposite direction, a cam operated arm operatively connected with said shaft for oscillating the same to raise and lower the gauging roll, and means for adjusting the angular position of said arm with respect to said shaft whereby the amount that the gauging roll is lifted may be varied.

29. Apparatus in accordance with claim 28 in which said cam operated arm is loosely mounted on said shaft and the means for adjusting the angular position of the arm relative to the shaft comprises a second arm secured to the shaft, a toothed locking element carried by said second arm, said cam operated arm having a toothed portion with which the teeth on said locking element engage, and means for detachably clamping said locking element to said second arm whereby the inter-engaging teeth may be made to lock the cam operated arm at the desired angular position with respect to the shaft.

30. Apparatus for grading and sorting leather blanks comprising means to gauge the blanks, means for feeding the blanks to and by the gauging means comprising an endless chain provided with a plurality of equally spaced feed dogs, means whereby the spacing of said dogs may be varied, sorting means controlled by the gauging means for sorting the gauged blanks, said sorting means including a carrier having a plurality of receptacles to receive the gauged blanks, means for operating said chain at a constant speed, means for moving said carrier, and means for changing the speed at which the carrier moves whereby when the spacing of the dogs on the feed chain is changed to accommodate blanks of a certain length a corresponding change can be made in the speed of the carrier.

31. Apparatus in accordance with claim 30 in which the means for gauging the blanks comprises a gauging roll, means for lifting said roll near the end of the gauging operation and for lowering the same near the beginning of the gauging operation, and means whereby the speed of operation of the roll lifting and lowering means may be changed.

32. Apparatus for grading and sorting leather blanks comprising gauging mechanism adapted to progressively gauge every point along at least a part of the length of the edge of a moving leather blank, and electrically controlled sorting mechanism to sort the gauged blanks in accordance with the measurement of the thinnest spot as determined by the gauging mechanism, said sorting mechanism including a series of electro-magnetic devices, means for successively and selectively operating said devices as the gauging mechanism responds to the variations in thickness of the blank, a carrier for the blanks, said carrier having a number of blank-holders each adapted to receive a gauged blank whereby the carrier may transport a number of blanks at one time, blank-discharging means adapted when actuated to discharge a blank from a holder if one happens to be therein, a plurality of stations among which the blanks are distributed by the carrier in accordance with the measurement of the thinnest spot as determined by the gauging mechanism, and means whereby the electro-magnetic device which was operated when the gauging mechanism gauged the thinnest spot of the blank causes actuation of the blank-discharging means to discharge such blank from its holder when the holder carrying that blank arrives at a predetermined one of said stations.

33. Apparatus for grading and sorting leather comprising gauging mechanism to progressively gauge every point along at least a part of the length of the edge of a leather blank, and electrically controlled sorting mechanism to sort the gauged blanks in accordance with the measurement of the thinnest spot as determined by the gauging mechanism, said sorting mechanism including a plurality of relays, means for successively and selectively closing said relays as the gauging mechanism responds to the variations in thickness of the blank, a series of electrical devices, there being one of such electrical devices for each relay and each of such devices being adapted to be energized when current passes across the contacts of the corresponding relay, a carrier for the blanks, said carrier having a number of blank-holders each adapted to receive a gauged blank whereby the carrier may transport a number of blanks at one time, blank-discharging means adapted when actuated to discharge a blank from a holder if one happens to be therein, a plurality of stations among which the blanks are distributed by the carrier in accordance with the measurement of the thinnest spot as determined by the gauging mechanism, and means whereby the electrical device which was energized when the gauging mechanism gauged the thinnest spot of the blank causes actuation of the blank-discharging means to discharge such blank from its holder when the holder carrying that blank arrives at a predetermined one of said stations.

34. Apparatus for grading and sorting leather blanks comprising means for feeding the blanks, gauging mechanism adapted to progressively gauge every point along at least a part of the length of the edge of a blank while it is being moved by the feeding means, and sorting mechanism to sort the gauged blanks in accordance with the measurement of the thinnest spot as determined by the gauging mechanism and comprising a movable carrier to receive the gauged blanks, means for moving the carrier, said carrier having a number of blank-holders each adapted to receive a gauged blank whereby the carrier may transport a number of blanks at one time, blank-discharging means adapted when actuated to discharge a blank from a holder if one happens to be therein, electro-magnetic devices adapted to be successively and selectively energized as said gauging mechanism responds to variations in thickness of the blank, a plurality of discharge stations, and means whereby one of the electro-magnetic devices actuated during the gauging of a blank causes actuation of the blank-discharging means when the holder carrying that blank arrives at a predetermined one of said stations.

35. Apparatus for grading and sorting leather blanks comprising means for feeding the blanks, gauging mechanism adapted to progressively gauge every point along at least a part of the length of the edge of a blank while it is being moved by the feeding means, said gauging mechanism comprising an element adapted to contact with a surface of the moving blank and adapted to follow the irregularities in said surface, and sorting mechanism to sort the gauged blanks in accordance with the measurement of the thinnest spot as determined by the gauging mechanism, and comprising a movable carrier to receive the gauged blanks, means for moving the carrier, said carirer having a number of blank-holders each adapted to receive a gauged blank whereby the carrier may transport a number of blanks at one time, blank-discharging means adapted when actuated to discharge a blank from a holder if one happens to be therein, electro-magnetic devices adapted to be successively and selectively energized as said gauging element responds to variations in thickness of the blank, a plurality of discharge stations, and means whereby one of the electro-magnetic devices actuated during the gauging of a blank causes actuation of the blank-discharging means when the holder carrying that blank arrives at a predetermined one of said stations.

36. Apparatus for grading and sorting leather blanks comprising means for feeding the blanks, gauging mechanism adapted to progressively gauge every point along at least a part of the length of opposite edges of a blank while it is being moved by the feeding means, said gauging mechanism comprising independently responsive elements adapted to contact with a surface of the moving blank along opposite edges thereof and adapted to follow the irregularities in said surface, and sorting mechanism to sort the gauged blanks in accordance with the measurement of the thinnest spot along either of said opposite edges as determined by the gauging mechanism and comprising a movable carrier to receive the gauged blanks, means for moving the carrier, said carrier having a number of blank-holders each adapted to receive a gauged blank whereby the carrier may transport a number of blanks at one time, blank-discharging means adapted when actuated to discharge a blank from a holder if one happens to be therein, electro-magnetic devices adapted to be successively and selectively energized as said gauging elements respond to variations in thickness of the blank, a plurality of discharge stations, and means whereby one of the electro-magnetic devices actuated during the gauging of a blank causes actuation of the blank-discharging means when the holder carrying that blank arrives at a predetermined one of said stations.

37. Apparatus for grading and sorting leather blanks comprising means for feeding the blanks, gauging mechanism adapted to progressively gauge every point along at least a part of the length of the edge of a blank while it is being moved by the feeding means, and sorting mechanism to sort the gauged blanks in accordance with the measurement of the thinnest spot as determined by the gauging mechanism and comprising a movable carrier to receive the gauged blanks, means for moving the carrier, said carrier having a number of receptacles each adapted to receive a gauged blank whereby the carrier may transport a number of blanks at one time, means on each receptacle adapted when actuated to discharge a blank from the receptacle if one happens to be therein, electro-magnetic devices adapted to be successively and selectively energized as said gauging mechanism responds to variations in thickness of the blank, a plurality of discharge stations, and selecting mechanism adapted to be set by said electro-magnetic devices in accordance with the measurement of the thinnest spot on the blank as determined by the gauging mechanism during the complete gauging of the blank, said selecting mechanism when so set serving to cause actuation of said means on that receptacle which receives the gauged blank to discharge the blank when the carrier moves such receptacle to the station selected for that particular measurement.

38. Apparatus for grading and sorting leather blanks comprising means for feeding the blanks, gauging mechanism adapted to progressively gauge every point along at least a part of the length of the edge of a blank while it is being moved by the feeding means, and sorting mechanism to sort the gauged blanks in accordance with the measurement of the thinnest spot as determined by the gauging mechanism and comprising a movable carrier to receive the gauged blanks, means for moving the carrier, said carrier having a number of receptacles each adapted to receive a gauged blank whereby the carrier may transport a number of blanks at one time, electrically operated means on each receptacle adapted when actuated to discharge a blank from the receptacle if one happens to be therein, electro-magnetic devices adapted to be successively and selectively energized as said gauging mechanism responds to variations in thickness of the blank, a plurality of discharge stations, and selecting mechanism adapted to be set by said electro-magnetic devices in accordance with the measurement of the thinnest spot on the blank as determined by the gauging mechanism during the complete gauging of the blank, said selecting mechanism when so set serving to cause actuation of said electrically operated means on that receptacle which receives the gauged blank to discharge the blank when the carrier moves such receptacle to the station selected for that particular measurement.

39. Apparatus for grading and sorting leather blanks comprising means responsive to variations in the thickness of a blank for progressively gauging it as the blank moves in contact therewith, means adapted to move continuously in an endless path for feeding leather blanks successively to the gauging means, and sorting mechanism including electro-magnetic devices which are successively and selectively energized as the gauging means responds to variations in thickness of the blank to sort the gauged blanks in accordance with the measurement of the thinnest spot as determined by the gauging means, said sorting mechanism also including a carrier having blank-holders to receive gauged blanks, said blank-holders being movable in an endless path by the carrier, means for imparting continuous movement to the carrier, blank discharging means adapted when actuated to discharge a blank from a holder if one happens to be therein a plurality of stations at which the blanks are discharged and among which they are distributed by the carrier, and means whereby one of the electro-magnetic devices actuated during the gauging of a blank causes actuation of the blank-discharging means when the holder carrying that blank arrives at a predetermined one of said stations.

40. Apparatus for grading and sorting leather blanks comprising means responsive to variations in thickness of a blank for progressively gauging it as the blank moves in contact therewith, an endless chain for feeding leather blanks successively to the gauging means, means for imparting continuous movement to said chain, and sorting mechanism including electro-magnetic devices which are successively and selectively energized as the gauging means responds to variations in thickness of the blank to sort the gauged blanks in accordance with the measurement of the thinnest spot as determined by the gauging means, said sorting mechanism also including a rotary carrier having blank-holders to receive gauged blanks, means for imparting continuous unidirectional rotation to the carrier, blank discharging means adapted when actuated to discharge a blank from a holder if one happens to be therein a plurality of stations at which the blanks are discharged and among which they are distributed by the carrier, and means whereby one of the electro-magnetic devices actuated during the gauging of a blank causes actuation of the blank-discharging means when the holder carrying that blank arrives at a predetermined one of said stations.

41. Apparatus for grading and sorting leather blanks comprising gauging mechanism, electrically controlled sorting mechanism to sort the gauged blanks in accordance with the measurement of the thinnest spot as determined by the gauging mechanism, said sorting mechanism including a carrier having a number of blank-holders each adapted to receive a gauged blank, a plurality of series of slidable pins mounted to move in accordance with the movement of the blank-holders on the carrier, electro-magnetic devices adapted to slide said pins to set them, means whereby one of said electro-magnetic devices is energized to set one of said pins as a consequence of the gauging of a blank, the particular device so energized depending upon the measurement of the thinnest spot of the blank as determined by the gauging mechanism during the gauging operation, a plurality of discharge points among which the gauged blanks are distributed by the carrier, and means operating as a result of the setting of said pin to discharge the blank for which the pin was set when the carrier moves the blank-holder containing that blank to a predetermined one of said discharge points.

42. Apparatus for grading and sorting leather blanks comprising gauging mechanism to progressively gauge every point along at least a part of the length of the edge of a blank, said gauging mechanism comprising at least one gauging roll, an arm adapted to be oscillated by said gauging mechanism as the latter responds to the variations in thickness of the blank, a series of electric contacts over which said arm oscillates, selecting mechanism the setting of which determines the place at which the blank is delivered, electrical means for setting said selecting mechanism including electrical devices which are successively and selectively energized as said arm oscillates over said contacts, a master controller operating to complete a circuit to said oscillating arm near the beginning of the gauging operation and to open said circuit near the end of the gauging operation, and means to lower said gauging roll into contact with the blank before the master controller completes the circuit to said arm and to lift said gauging roll away from the blank after the master controller interrupts the circuit to said arm.

43. Apparatus for grading and sorting leather blanks comprising gauging mechanism to progressively gauge every point along at least a part of the length of the edge of a blank, an arm adapted to be oscillated by said gauging mechanism as the latter responds to the variations in thickness of the blank, a series of electric contacts over which said arm oscillates, selecting mechanism the setting of which determines the place at which the blank is delivered, electrical means for setting said selecting mechanism including a series of relays adapted to be selectively energized as the arm moves over said series of contacts, a holding coil for each relay, an electric circuit in which said holding coils are included, and a master controller operating to complete a circuit to said oscillating arm near the beginning of the gauging operation and to open said circuit near the end of the gauging operation, said master controller having means to make and break said circuit in which the holding coils are included.

44. Apparatus for grading and sorting leather blanks comprising gauging mechanism to progressively gauge every point along at least a part of the length of the edge of a blank, an arm adapted to be oscillated by said gauging mechanism as the latter responds to the variations in thickness of the blank, a series of electric contacts over which said arm oscillates, selecting mechanism the setting of which determines the place at which the blank is delivered, electrical means for setting said selecting mechanism comprising a series of relays adapted to be selectively energized as the arm moves over said series of contacts, each of said relays having a pair of contacts, a solenoid in circuit with each pair of relay contacts, any one of said solenoids when energized serving to set said selecting mechanism, means whereby the only relay which remains closed after actuation is the one which is energized when the gauging mechanism detects the thinnest spot of the blank, and a master controller operating to complete a circuit to said oscillating arm near the beginning of the gauging operation and to open said circuit near the end of the gauging operation, said master controller having means operating after the circuit to said oscillating arm is interrupted to complete a circuit through the contacts of the relay that is held closed and through the corresponding solenoid and to thereafter open said circuit.

45. Apparatus for grading and sorting leather blanks comprising gauging mechanism to progressively gauge every point along at least a part of the length of the edge of a blank, an arm adapted to be oscillated by said gauging mechanism as the latter responds to the variations in thickness of the blank, a series of electric contacts over which said arm oscillates, selecting mechanism the setting of which determines the place at which the blank is delivered, electrical means for setting said selecting mechanism comprising a series of relays adapted to be selectively energized as the arm moves over said series of contacts, each of said relays having a pair of contacts, a solenoid in circuit with each pair of relay contacts, any one of said solenoids when energized serving to set said selecting mechanism, means whereby the only relay which remains closed after actuation is the one which is energized when the gauging mechanism detects the thinnest spot of the blank, said means including a holding coil for each relay and an electric circuit in which the holding coils are included, and a master controller operating to complete a circuit to said oscillating arm near the beginning of the gauging operation and to open said circuit near the end of the gauging operation, said master controller having means to make and break said circuit in which the holding coils are included such that said circuit is in a completed condition when the circuit to said oscillating arm is completed and is broken after the circuit to said oscillating arm is broken, and said master controller also having means operating after the circuit to said oscillating arm is interrupted to complete a circuit through the contacts of the relay which remains closed and through the corresponding solenoid and to thereafter open said circuit.

46. Apparatus for grading and sorting leather blanks comprising means to gauge the blanks, and sorting means controlled by the gauging means for sorting the gauged blanks, said sorting means including a carrier provided with a plurality of receptacles for the blanks, said carrier being adapted to move the receptacles in a horizontal path, each receptacle having an inclined back wall which is advanced face-on by the movement of the carrier, a pair of side walls projecting from said inclined back wall, a pivoted bottom adapted when held in its normal position to retain a blank in the receptacle and adapted when released to discharge the blank therefrom, said parts being adapted to support the blank with its longitudinal axis extending in a direction from top to bottom of the receptacle and so that the blank leans against said inclined back wall with its lower edge resting on the pivoted bottom and so that the blank is advanced face-on by the movement of the carrier, a releasable latch for retaining said pivoted bottom in its normal position, and electro-magnetic means carried by the receptacle adapted when energized to release said latch to permit the pivoted bottom to discharge the blank.

47. Apparatus for grading and sorting leather comprising gauging mechanism, sorting mechanism to sort the gauged blanks in accordance with the measurement of the thinnest spot as determined by the gauging mechanism, said sorting mechanism including a rotary carrier having receptacles to receive the gauged blanks, a vertical series of slidable pins for each receptacle mounted to move with the carrier, means for setting one of the pins of a series when a blank is deposited in the receptacle corresponding with that series, the particular pin of the series that is set depending upon the measurement of the thinnest spot of the blank as determined by the gauging mechanism, a plurality of discharge points among which the blanks are distributed by the carrier, and means operating as a result of the setting of said pin to discharge the blank from the corresponding receptacle at a predetermined one of said points, said last-named means comprising a helically arranged series of stationary electrical contacts with one of which a set pin is adapted to engage when the blank for which that pin has been set arrives at the predetermined discharge point, an electric circuit in one side of which all of said electrical contacts are connected and in the other side of which all of said slidable pins are connected, electrically operated means in said circuit for discharging the blank from the receptacle, and means to energize said circuit whereby any set pin which engages a contact will cause the blank for which that pin has been set to be discharged from its receptacle.

CONSTANTINE T. TROY.